US009538316B2

(12) United States Patent
Chiao et al.

(10) Patent No.: US 9,538,316 B2
(45) Date of Patent: Jan. 3, 2017

(54) SMART MONITOR SYSTEM AND HAND-HELD ELECTRONIC DEVICE

(71) Applicants: HannStar Display (Nanjing) Corporation, Nanjing (CN); HANNSTAR DISPLAY CORPORATION, Taipei (TW)

(72) Inventors: Yu-Chi Chiao, Taipei (TW); Hsu-Ho Wu, Taipei (TW); Tien-Rong Lu, Taipei (TW)

(73) Assignees: HANNSTAR DISPLAY (NANJING) CORPORATION, Nanjing (CN); HANNSTAR DISPLAY CORPORATION, Taipei (TW)

( * ) Notice: Subject to any disclaimer, the term of this patent is extended or adjusted under 35 U.S.C. 154(b) by 0 days.

(21) Appl. No.: 14/740,939

(22) Filed: Jun. 16, 2015

(65) Prior Publication Data

US 2016/0029147 A1    Jan. 28, 2016

(30) Foreign Application Priority Data

Jul. 25, 2014  (CN) .......................... 2014 1 0359712
Jul. 25, 2014  (CN) .......................... 2014 1 0360187
Jul. 25, 2014  (CN) .......................... 2014 1 0360189
Jul. 25, 2014  (CN) .......................... 2014 1 0361308
Jul. 25, 2014  (CN) .......................... 2014 1 0361718
Jul. 25, 2014  (CN) .......................... 2014 1 0361720

(51) Int. Cl.
| | |
|---|---|
| *H04B 5/00* | (2006.01) |
| *H04W 4/00* | (2009.01) |
| *G06F 3/01* | (2006.01) |
| G06F 3/0488 | (2013.01) |
| H04B 1/20 | (2006.01) |
| G06F 3/0486 | (2013.01) |
| G06F 3/0484 | (2013.01) |

(52) U.S. Cl.
CPC .............. *H04W 4/008* (2013.01); *G06F 3/013* (2013.01); *H04B 5/0031* (2013.01); (Continued)

(58) Field of Classification Search
CPC .... H04W 4/008; G06F 3/0416; H04B 5/0031; H04B 5/0037; H04B 1/202
(Continued)

(56) References Cited

U.S. PATENT DOCUMENTS 5,825,352 A  10/1998 Bisset et al.
5,946,647 A   8/1999 Miller et al.
(Continued)

*Primary Examiner* — April G Gonzales
(74) *Attorney, Agent, or Firm* — Muncy, Geissler, Olds & Lowe, P.C.

(57) ABSTRACT

A smart monitor system includes a hand-held electronic device and a monitor. The hand-held electronic device includes a panel, a control unit, a touch-sensing cover and a wireless communication unit. The touch-sensing cover has a cover and a touch-sensing structure. The cover is disposed on the side of the hand-held electronic device opposite the panel. Partial or total area of the touch-sensing structure is disposed on the cover. The touch-sensing structure is electrically connected to the control unit. The wireless communication unit has a wireless communication chip and an antenna. The wireless communication chip is electrically connected to the control unit, and the antenna is disposed on the touch-sensing cover. The smart monitor system can communicate with and controls the monitor through the hand-held electronic device for various application.

18 Claims, 17 Drawing Sheets

(52) U.S. Cl.
CPC ......... *H04B 5/0037* (2013.01); *G06F 3/0486* (2013.01); *G06F 3/0488* (2013.01); *G06F 3/04842* (2013.01); *G06F 2203/0381* (2013.01); *G06F 2203/04808* (2013.01); *H04B 1/202* (2013.01)

(58) Field of Classification Search
USPC ....................................................... 455/41.1
See application file for complete search history.

(56) References Cited

U.S. PATENT DOCUMENTS

| | | | |
|---|---|---|---|
| 6,473,006 B1 | 10/2002 | Yu et al. | |
| 6,868,283 B1 | 3/2005 | Bonansea et al. | |
| 7,020,849 B1 | 3/2006 | Chen | |
| 7,274,353 B2 | 9/2007 | Chiu et al. | |
| 7,289,772 B1 | 10/2007 | Bonansea et al. | |
| 7,663,607 B2 | 2/2010 | Hotelling et al. | |
| 7,864,163 B2 | 1/2011 | Ording et al. | |
| 7,912,500 B2 * | 3/2011 | Maschke | A01K 15/021 446/268 |
| 8,238,979 B2 * | 8/2012 | Rajamani | H04M 1/7253 455/41.2 |
| 8,526,882 B2 * | 9/2013 | Ye | G09G 5/006 455/3.05 |
| 8,592,697 B2 | 11/2013 | Hotelling et al. | |
| 8,977,206 B2 * | 3/2015 | Ye | H04N 21/4122 375/240.25 |
| 2011/0237189 A1 * | 9/2011 | Ye | G09G 5/006 455/41.2 |
| 2013/0321361 A1 | 12/2013 | Lynch et al. | |

* cited by examiner

SMART MONITOR SYSTEM AND HAND-HELD ELECTRONIC DEVICE

CROSS REFERENCE TO RELATED APPLICATIONS

This Non-provisional application claims priority under 35 U.S.C. §119(a) on Patent Application No(s). 201410360189.5, 201410361720.0, 201410361308.9, 201410359712.2, 201410361718.3, and 201410360187.6 filed in People's Republic of China on Jul. 25, 2014, the entire contents of which are hereby incorporated by reference.

BACKGROUND

Technical Field

The invention relates to a monitor system and an electronic device, in particular to a smart monitor system and a hand-held electronic device.

Related Art

With the progress of technologies, various novel information devices are invented, such as cell phones, tablet computers, ultrabooks, or GPS (Global Positioning System) navigation device, etc. In addition to conventional input or control manners by keyboard or mouse, utilizing the touch-control technique to operate the information device is a straight and popular operative manner. The touch display device has a friendly and straight input operative interface, and therefore users of all ages can select or operate the touch display device by fingers.

As to the conventional hand-held electronic device with the touch function, the touch operations are all directly performed on the display panel. However, for the operation on the panel, fingers may shade the user's view or the objects displayed on the display panel, such that the user may erroneously touch and open an undesired link arranged in a high information content density on the display panel by user's finger. Thus, it is inconvenient to operate.

Besides, even if the size of display panel of the hand-held electronic device is enlarged, the enlargement is limited. Its volume is limited to the size which is convenient for users to hold and carry. If the user wants to share the screen displayed by the hand-held electronic device or display it on other monitors, an additional physic cable is required for connection and it is not convenient.

In addition, due to contacting the touch panel to operate the electronic device, it often scratches the panel. Besides, when operating well-known hand-held electronic device with touch function, it usually requires one hand to hold the hand-held electronic device and the other hand to operate on the panel. If the user only uses one hand to hold and operate the device, only the thumb can manipulate the device and thus is it not convenient.

Furthermore, the above-mentioned panel also needs to be configured with the rare earth transparent touch-sensing layer such as ITO (indium tin oxide) so as to be kept in high transparent display performance. But since the rare earth metal indium is unceasingly consumed, the cost of the product is getting higher and higher. Besides, the conductivity of the rare earth metal is worse than that of the normal metal, such that the detection sensitivity for touch is restricted. Therefore, using the rare earth as the transparent touch-sensing layer in the touch display panel is not conducive to the environmental resources and energy conservation. Besides, the transparent touch-sensing layer of ITO in the display panel also reduces the transmittance of the display panel. Even if the ITO is replaced by the metal mesh, the metal interference fringe will be caused to affect the readability of the display panel and therefore the performance and convenience of the manual operation will be reduced.

Therefore, an aspect of the invention is to provide a shadeless touch hand-held electronic device which can prevent the user's view from being shaded by user's finger and reduce the scratch problem. It also provide a smart monitor system which communicates with and controls the monitor through the shadeless touch hand-held electronic device for various application.

SUMMARY

An aspect of the invention is to provide a smart monitor system which is able to communicate with and control the monitor by a hand-held electronic device is provided.

An aspect of the invention is to provide a smart internet system which enables a hand-held electronic device to communicate with and control the monitor through a wireless access point is provided.

An aspect of the invention is to provide a shadeless touch hand-held electronic device which can avoid the finger shades the user's view during operation and reduce the scratch on the panel, and operate another electronic apparatus through itself for various applications.

A smart monitor system comprises a hand-held electronic device and a monitor. The hand-held electronic device comprises a panel, a control unit, a touch-sensing cover and a wireless communication unit. The touch-sensing cover has a cover and a touch-sensing structure. The cover is disposed on the side of the hand-held electronic device opposite the panel. Partial or total area of the touch-sensing structure is disposed on the cover. The touch-sensing structure is electrically connected to the control unit. The wireless communication unit has a wireless communication chip and an antenna. The wireless communication chip is electrically connected to the control unit, and the antenna is disposed on the touch-sensing cover.

The monitor has a display panel and a wireless unit. The monitor is wirelessly connected to the wireless communication unit of the hand-held electronic device by the wireless unit. The wireless communication unit transmits a display information to the monitor by the wireless connection.

In one embodiment, the smart monitor system further comprises a wireless access point which is wirelessly connected to the wireless communication unit of the hand-held electronic device and the monitor. The display information is transmitted to the monitor through the wireless access point.

In one embodiment, when a user executes a mouse application program, the hand-held electronic device performs online connection with the monitor, so as to operate the monitor by the input action on the touch-sensing cover.

In one embodiment, the mouse application program is stored in the hand-held electronic device or the monitor.

In one embodiment, the smart monitor system further comprises an eyeball tracking module, which acquires eyeball information. The eyeball information corresponds to a position information on the panel, and the position information corresponds to an object displayed on the panel.

In one embodiment, the touch-sensing structure comprises a conductive layer, a metal nanowire layer, graphene or a metal mash.

In one embodiment, the hand-held electronic device further includes a charging module, and the monitor transmits a wireless charging energy to the charging module.

In one embodiment, a hand-held electronic device is wirelessly connected to a monitor. The hand-held electronic device comprises a panel, a control unit, a touch-sensing cover and a wireless communication unit. The touch-sensing cover has a cover and a touch-sensing structure. The cover is disposed on the side of the hand-held electronic device opposite the panel. Partial or total area of the touch-sensing structure is disposed on the cover. The touch-sensing structure is electrically connected to the control unit. The wireless communication unit has a wireless communication chip and an antenna. The wireless communication chip is electrically connected to the control unit, and the antenna is disposed on the touch-sensing cover. The wireless communication unit transmits a display information to the monitor by the wireless connection.

In one embodiment, the wireless communication unit includes infrared module, bluetooth module, zigbee module, radiofrequency module, NFC (near field communication) module.

In one embodiment, the antenna is disposed on the cover or integrated with the touch-sensing structure.

In one embodiment, the touch-sensing structure comprises a plurality of detection points, the control unit computes a trigger quantity, a trigger quantity distribution, a trigger morphology, a trigger time, a trigger frequency or a trigger location of the detection points with an interval in a predefined time period, and compares the trigger quantity, the trigger quantity distribution, the trigger morphology, the trigger time, the trigger frequency or the trigger location with an initiative determination condition pre-stored in the hand-held electronic device. It permits the touch-sensing structure to receive at least one input action inputted by a user if the trigger quantity, the trigger quantity distribution, the trigger morphology, the trigger time, the trigger frequency or the trigger location conforms to the initiative determination condition.

In one embodiment, the touch-sensing structure is disposed on the inner surface of the cover facing the panel, or disposed on the outer surface of the cover away from the panel, or simultaneously disposed on the inner surface of the cover facing the panel and the outer surface of the cover away from the panel.

In one embodiment, the touch-sensing structure comprises metal mesh, metal nanowires, transparent conducting film, carbon nanotube or graphene In one embodiment, the touch-sensing structure is directly formed on the cover.

In one embodiment, the hand-held electronic device further comprises a charging module, and the monitor transmits a wireless charging energy to the charging module.

In one embodiment, the cover comprises a cover body and a sidewall extending from at least a part of the edge of the cover body. The touch-sensing structure is disposed on the cover body and extends to at least one of the sidewall.

In one embodiment, a wiring connecting to the touch-sensing structure is gathered to a single side for wiring outlet.

In one embodiment, the width of the touch-sensing structure is less than that of the cover by 5%~10%.

In one embodiment, there is no touch-sensing structure allocated at a local region of the cover.

In one embodiment, the touch-sensing structure is single-layer or double-layer.

In one embodiment, the area of the touch-sensing structure and the area of the panel have a ratio relationship, and the control unit converts an input position into a display position on the panel according to the ratio relationship.

In one embodiment, the hand-held electronic device further comprises a NFC (near field communication) unit, and the NFC unit has a NFC chip and an antenna. The NFC chip is electrically connected to the control unit, and the antenna is disposed on the cover or the touch-sensing structure.

In one embodiment, the touch-sensing structure is capable of a wireless power transmission.

In one embodiment, the hand-held electronic device is operated by one hand.

In one embodiment, the panel displays an icon, and the icon corresponds to a mouse application program. The mouse application program is executed by the control unit when a user clicks the touch-sensing cover corresponding to the icon displayed on the panel.

In one embodiment, the hand-held electronic device further comprises an eyeball tracking module, which acquires eyeball information. The eyeball information corresponds to a position information on the panel, and the position information corresponds to an object displayed on the panel.

In one embodiment, the hand-held electronic device further comprises a capacitance detection unit which is coupled to the touch-sensing structure to detect the variation of the coupled capacitor between a first sensing line and a second sensing line and provides a first finger to input a signal. The hand-held electronic device confirms a clicked target according to the input signal from the first finger.

As mentioned above, the hand-held electronic device and the monitor of the smart monitor system transmit data by the wireless connection. In detail, the display information can be transmitted to the monitor through the hand-held electronic device, and displayed by the monitor. Therefore, the monitor can be utilized as the extended screen of the hand-held electronic device, the transparent touch-sensing layer of the rare earth metal is not necessary, and the manufacturing cost can be reduced. Moreover, no metal interference fringe will be caused to affect the readability of the display panel, and the performance and convenience of the manual operation will not be lowered down.

BRIEF DESCRIPTION OF THE DRAWINGS

The embodiments will become more fully understood from the detailed description and accompanying drawings, which are given for illustration only, and thus are not limitative of the present invention, and wherein.

DETAILED DESCRIPTION OF THE INVENTION

The embodiments of the invention will be apparent from the following detailed description, which proceeds with reference to the accompanying drawings, wherein the same references relate to the same elements.

Figure 1:
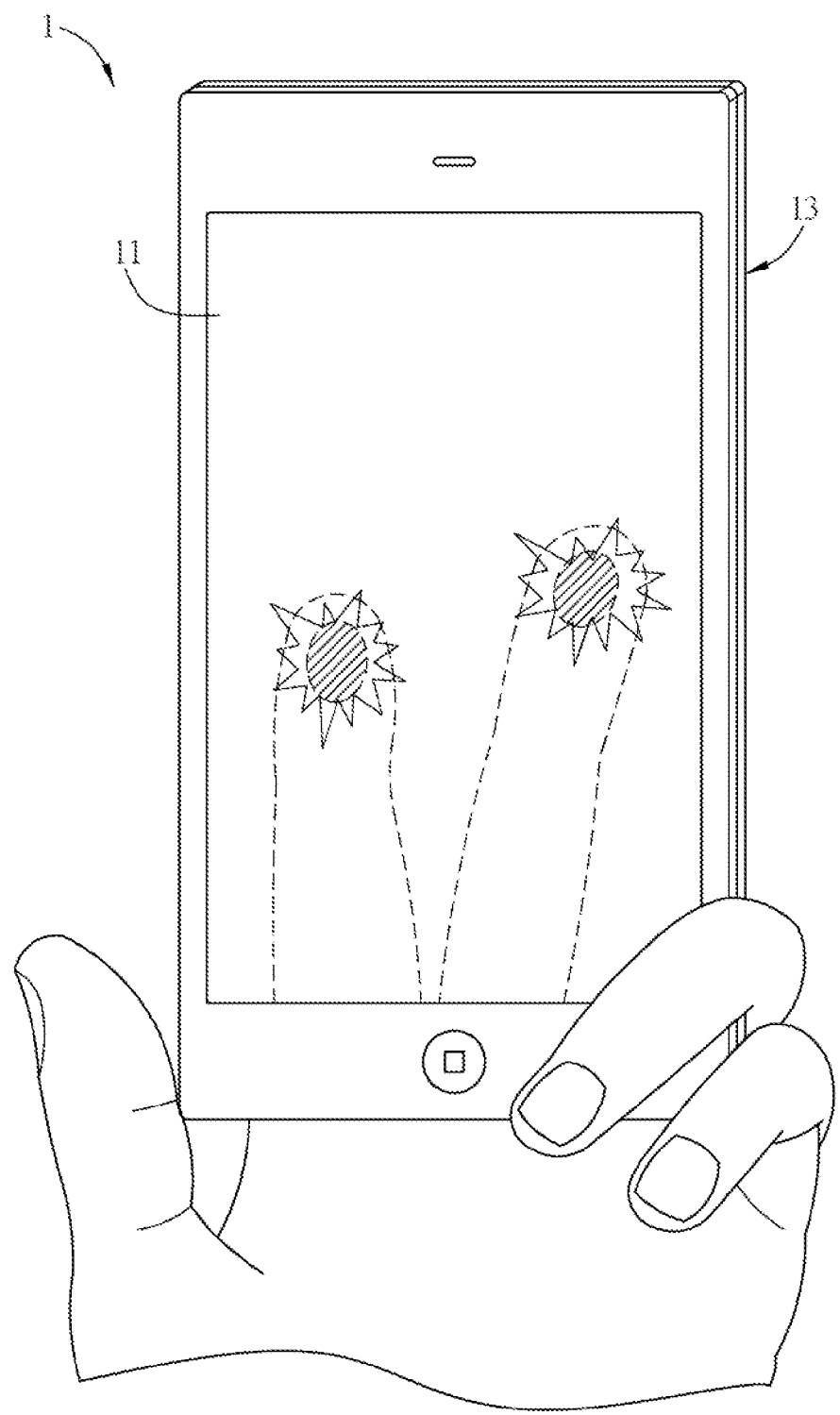
FIG. 1 is a schematic diagram showing the operation of the hand-held electronic device according to the embodiment of the invention.
Figure 2A:
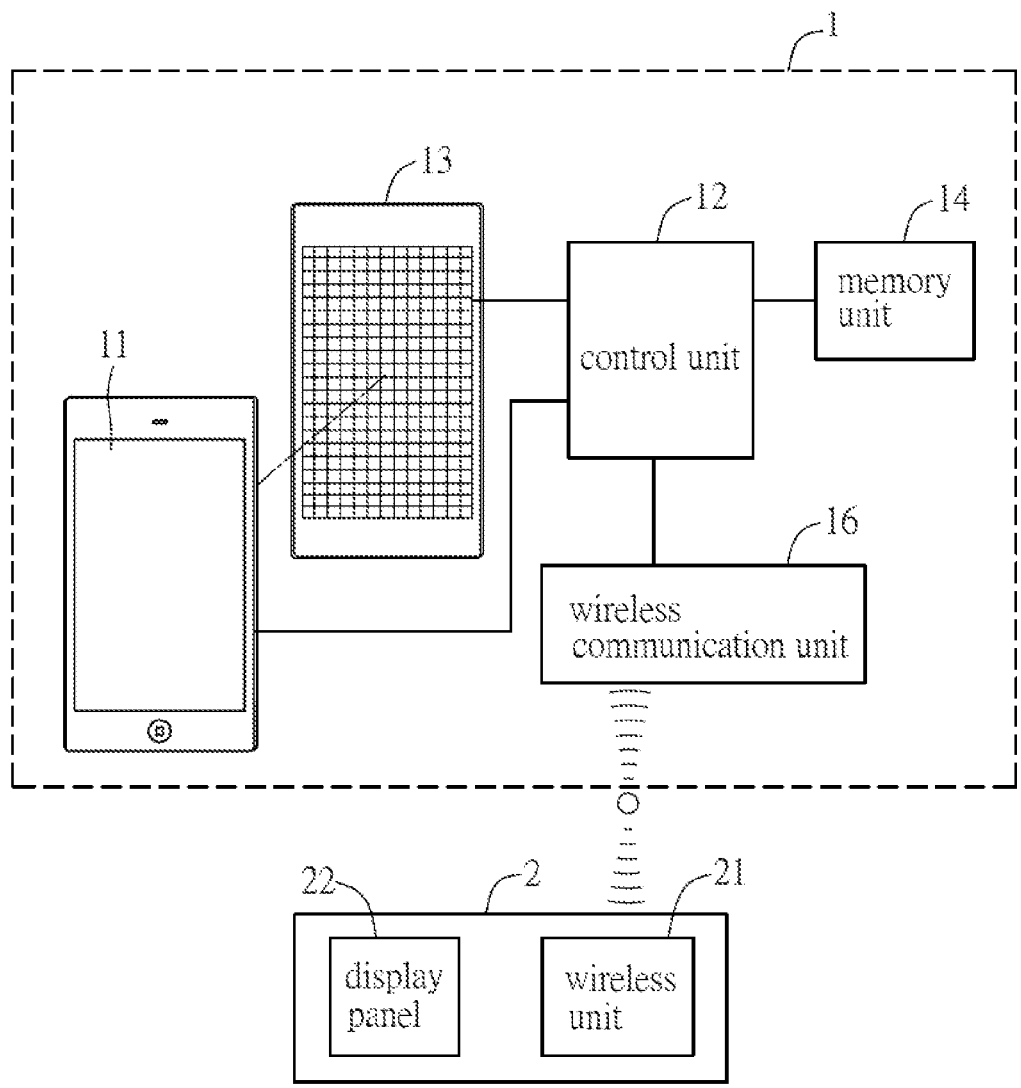
FIG. 2A is a function block diagram of the smart monitor system in FIG. 1.
Figure 2B:
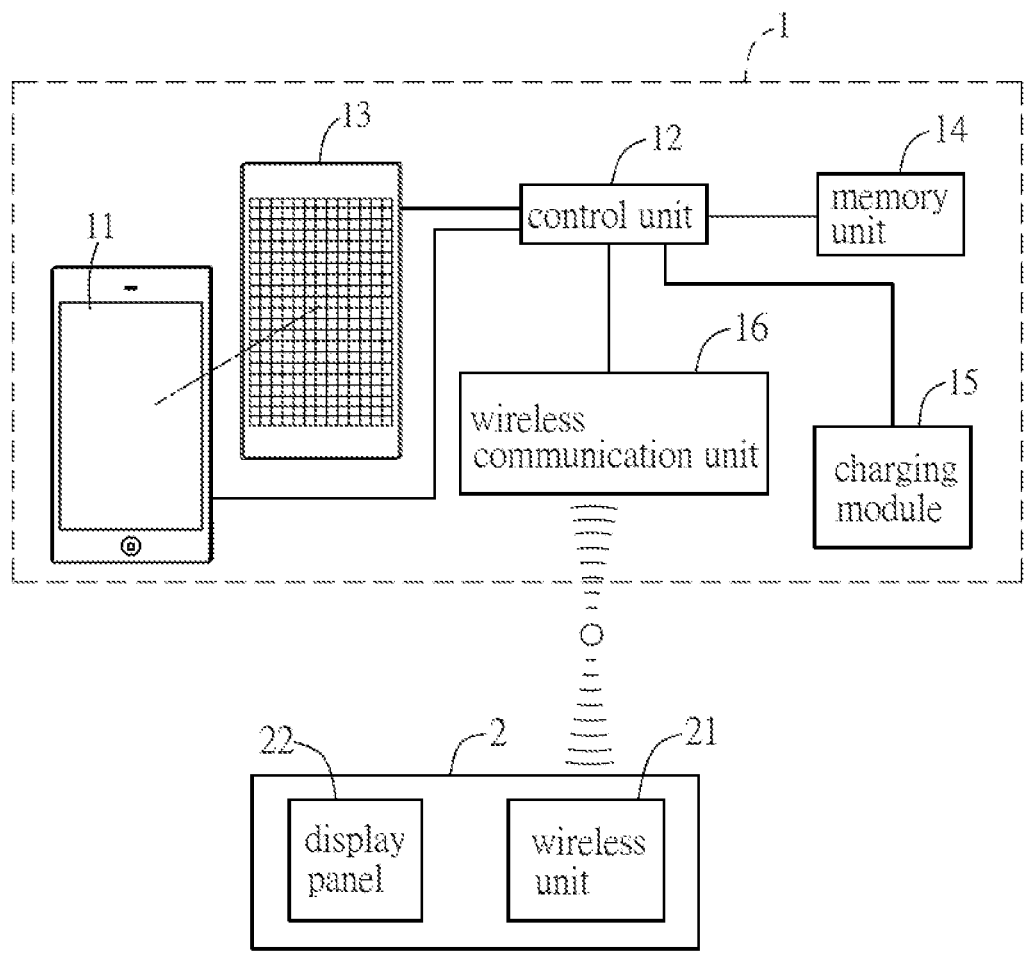
FIG. 2B is another function block diagram of the smart monitor system in FIG. 1.
Figure 2C:
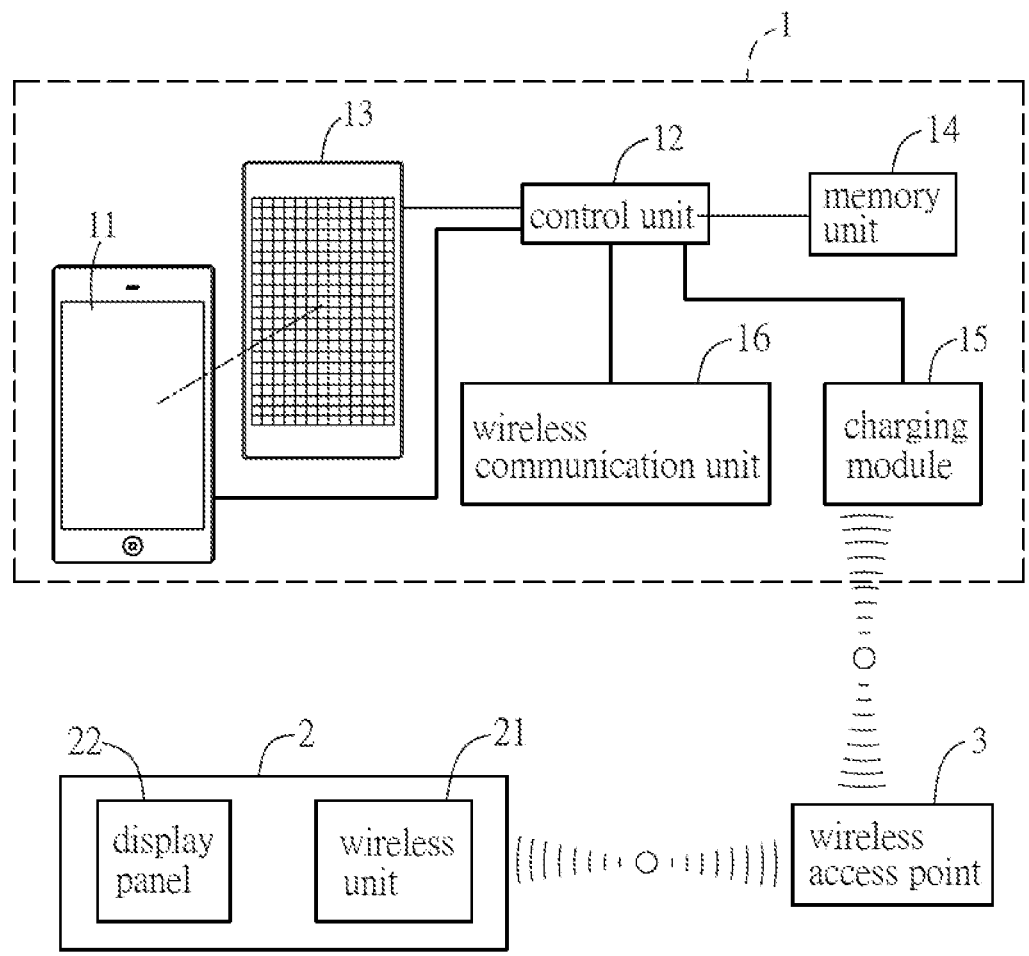
FIG. 2C is another function block diagram of the smart monitor system in FIG. 1.
Figure 3A:
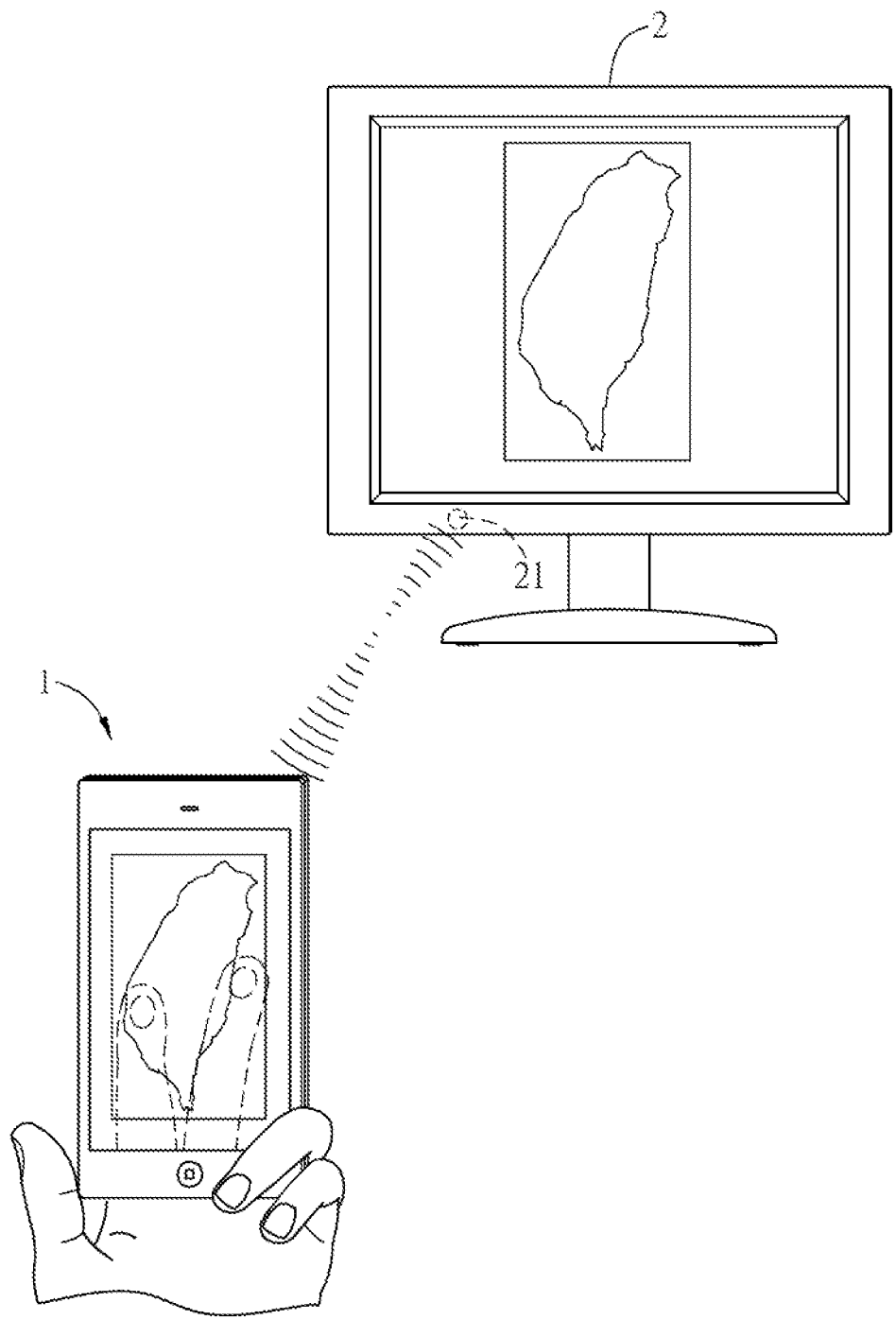
FIG. 3A is a schematic diagram showing the operation of the smart monitor system according to the embodiment of the invention.
Figure 3B:
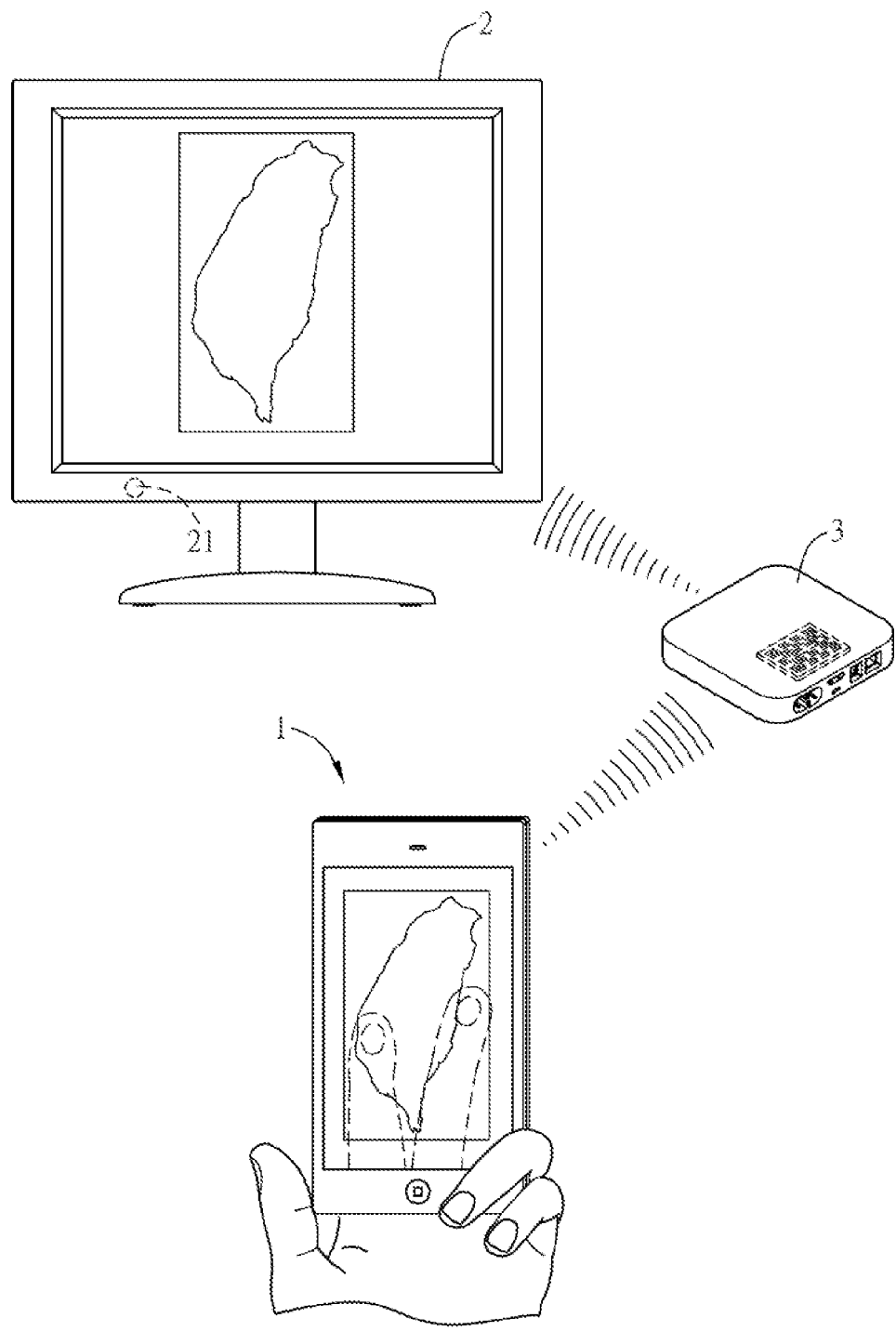
FIG. 3B is a schematic diagram showing the operation of the smart internet system according to the embodiment of the invention.
Figure 4A:
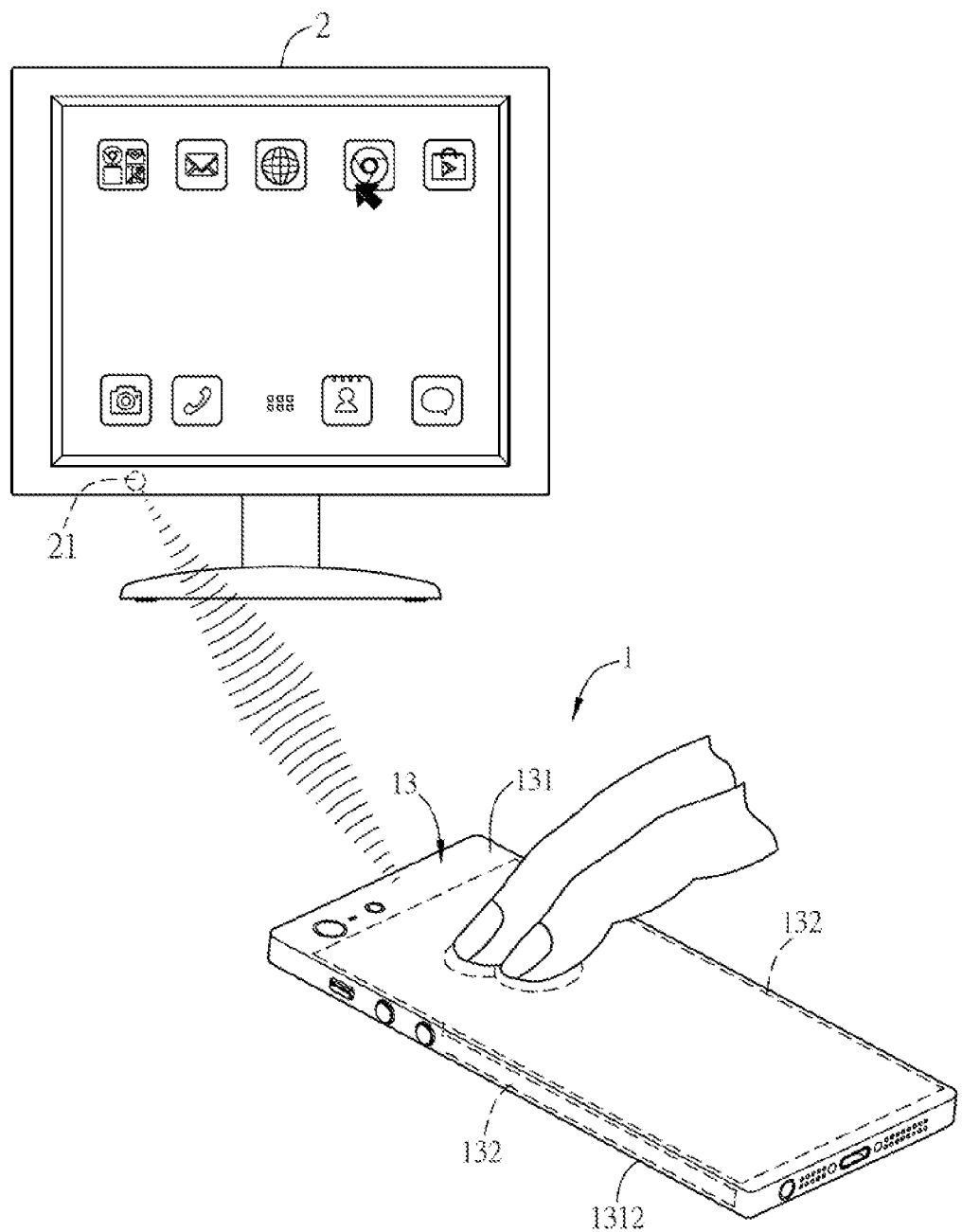
FIG. 4A to FIG. 4C are schematic diagrams showing the operation of another smart monitor system according to the embodiment of the invention.
Figure 4B:
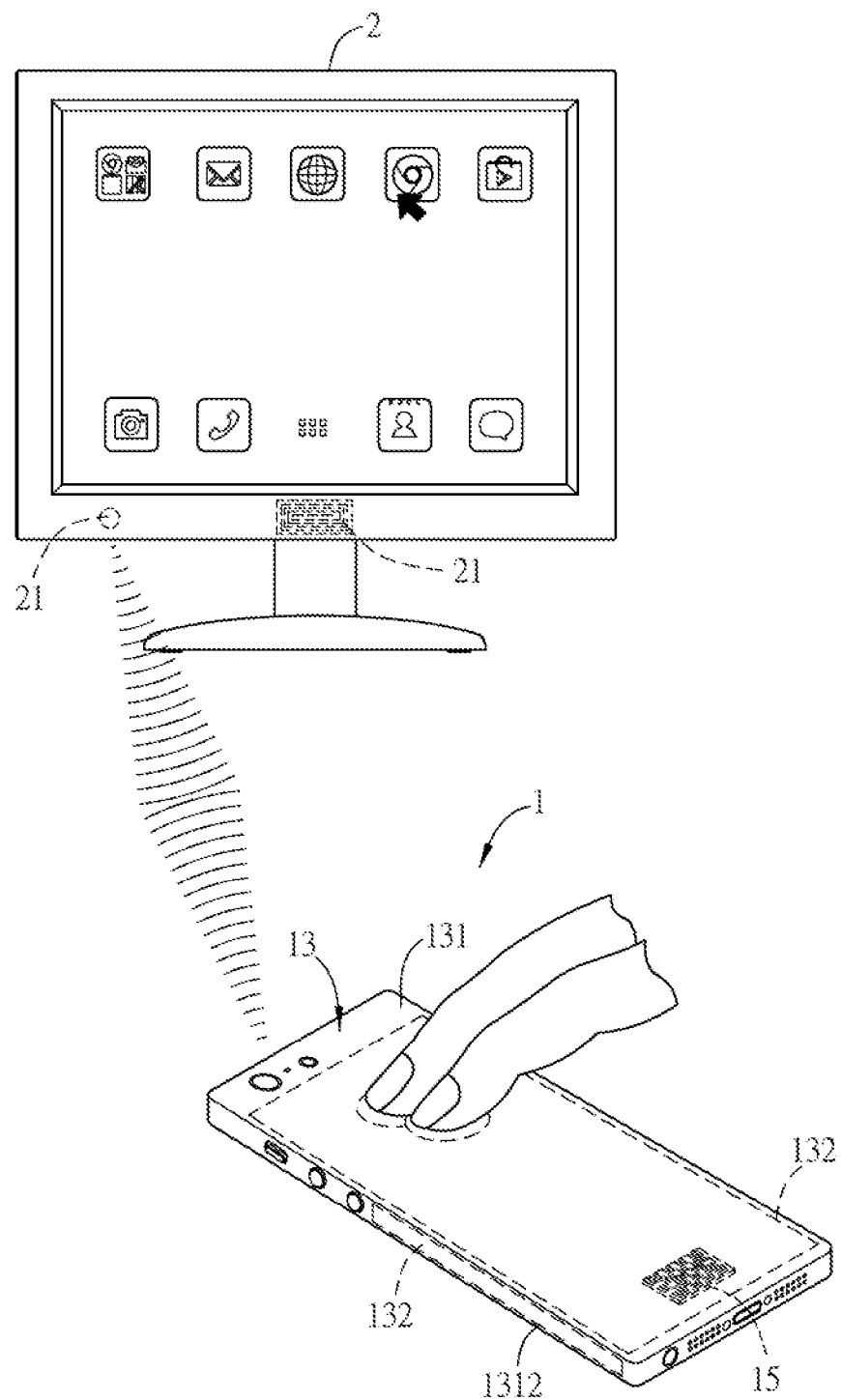
Figure 4C:
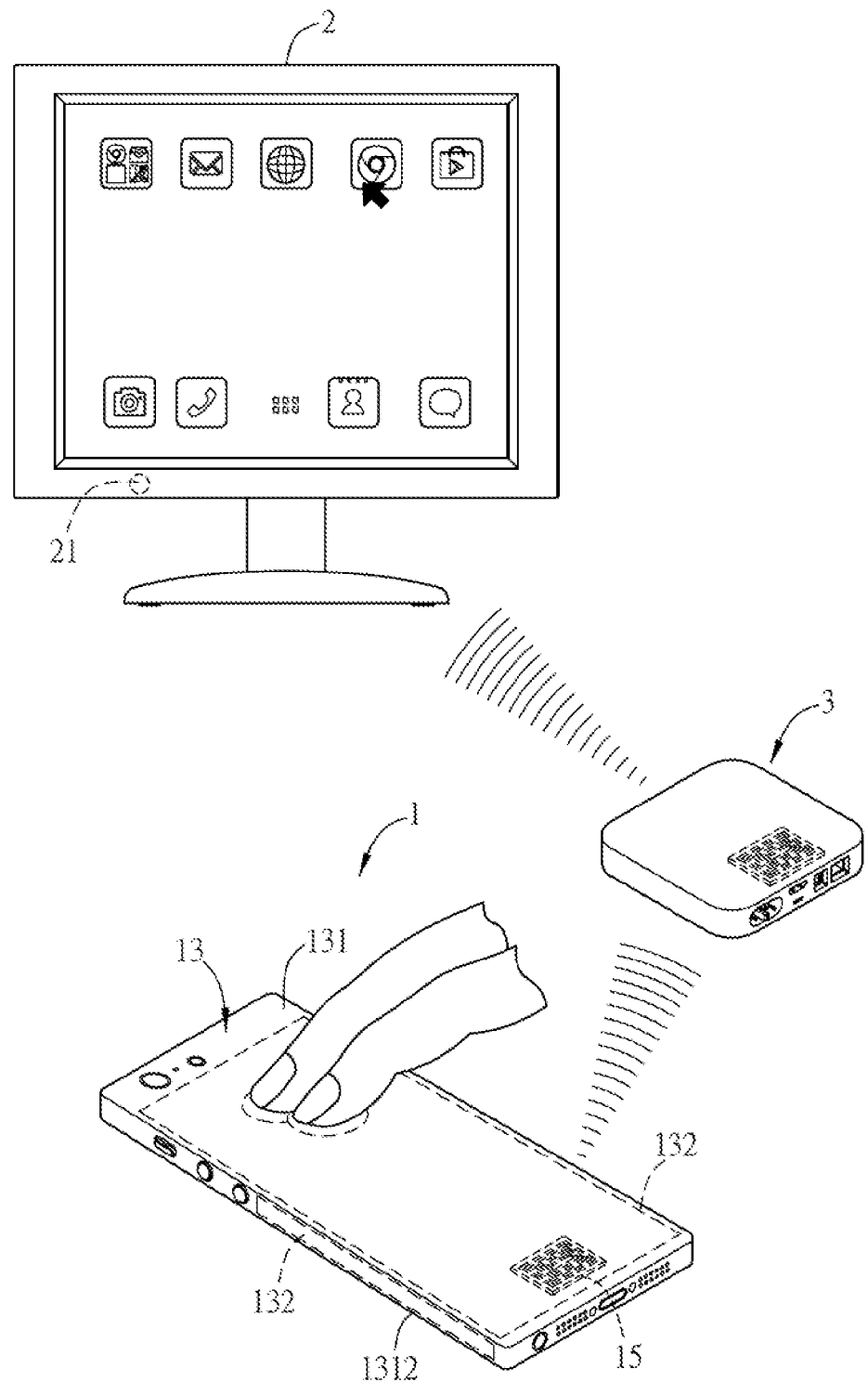

Referring to FIG. 1 to FIG. 2C, FIG. 1 is a schematic diagram showing the operation of the hand-held electronic device according to the embodiment of the invention, FIG. 2A is a function block diagram of the smart monitor system in FIG. 1, FIG. 2B is another function block diagram of the smart monitor system in FIG. 1, FIG. 2C is another function block diagram of the smart monitor system in FIG. 1, FIG. 3A is a schematic diagram showing the operation of the smart monitor system according to the embodiment of the invention, FIG. 3B is a schematic diagram showing the operation of the smart internet system according to the embodiment of the invention, and FIG. 4A to FIG. 4C are schematic diagrams showing the operation of another smart monitor system according to the embodiment of the invention.

The shadeless touch hand-held electronic device 1 (hereinafter abbreviated to hand-held electronic device 1) for example can be a smart phone, a tablet computer, a PDA (personal digital assistant), a GPS (global positioning system) device, etc. Here, it is a hand-held smart phone for example. Besides, the components of the hand-held electronic device 1 in the embodiment can be implemented or assembled with one or more than one hardware, software or firmware of the signal processing and/or integrated circuit or their any combination. In addition, the hand-held electronic device 1 is suitable for being operated by one hand.

In the embodiment, the hand-held electronic device 1 is wirelessly connected to the monitor 2. The monitor 2 for example can be a display screen. The monitor 2 at least includes a display panel 22 and a wireless unit 21. It is noted that the display panel 22 may also be capable of touch control, and it is not limited to only being capable of display.

Besides, in another embodiment, the hand-held electronic device 1 is wirelessly connected to the wireless access point 3, and the wireless access point 3 is wirelessly connected to the monitor 2 (FIG. 2C and FIG. 3B). In detail, the hand-held electronic device 1 can be directly connected with the monitor 2 or be connected with the monitor 2 through the wireless access point 3 (indirectly connected) on demands.

The hand-held electronic device 1 comprises a panel 11, a control unit 12, a touch-sensing cover 13 and a wireless communication unit 16. In addition, the hand-held electronic device 1 can further comprise a memory unit 14. The control unit 12 is electrically connected to the panel 11, the touch-sensing cover 13 and memory unit 14.

The panel 11 is disposed on one side of the hand-held electronic device 1, for example the side of the hand-held electronic device 1 closer to the user's view. The panel 11 can be for example LCD (liquid crystal display) panel, OLED (organic light emitting diode) display panel, electronic paper (electro-phoretic display panel) or touch display panel, and it is not limited thereto. In addition to displaying general screen, the panel 11 may also provide the user with GUI (graphical user interface). The GUI can have one or more than one graph (for example icons) to show any kind of objects on the panel 11.

The touch-sensing cover 13 includes a cover 131 and a touch-sensing structure 132. The touch-sensing structure 132 can be single-layer or double-layer.

Taking the touch-sensing structure 132 is double-layer for example. The touch-sensing structure 132 can comprise a first sensing layer and a second sensing layer to detect the input position on the touch-sensing structure 132 by the finger of the user. The first sensing layer comprises a plurality of first sensing lines which are disposed along a first direction (direction X). The second sensing layer comprises a plurality of second sensing lines which are disposed along a second direction (direction Y). In addition, in some embodiments, the first sensing layer and the second sensing layer are capable of a wireless power transmission.

In other embodiment of the invention, for example, the touch-sensing structure may be a single-layer structure. For example, the touch-sensing structure may comprise a plurality of sensing pads that are formed simultaneously, and the sensing pads may be single-layer. The sensing pads may be a transparent conductive layer or a metal mesh. The shape of the sensing pad includes, but not limited to, a triangle or a diamond shape, as long as they can help to achieve touch-sensing operations. Moreover, all sensing pads are not needed to have an identical shape.

The cover 131 is disposed on the other side of the hand-held electronic device 1 opposite the panel 11 (i.e. the opposite side to the display surface). Partial or total area of the touch-sensing structure 132 is disposed on the cover 131. In the embodiment, the cover 131 comprises a cover body 1311 and a sidewall 1312 extending from at least a part of the edge of the cover body 1311. The touch-sensing structure 132 is electrically connected to the control unit 12, partial or total area of the touch-sensing structure 132 can be disposed on the cover 131. In this embodiment, in addition to being disposed on the cover body 1311, the touch-sensing structure 132 can extend to the sidewalls 1312 at the two sides of the cover 131. That is, the touch-sensing structure 132 extends from the cover body 1311 directly to the two side edges of the cover 131, so as to increase the operation area for the user. In order to more effectively utilize the width of the cover 131 to dispose the touch-sensing structure 132, the width of the touch-sensing structure 132 is less than that of the cover (for example by 5%~10%). Namely, the width of the touch-sensing structure 132 is about 90%~95% of the width of the cover 131. In other embodiments, the touch-sensing structure 132 can be only disposed on the cover body 1311. Moreover, a physical key (such as a sound control key) can be replaced by the touch-sensing structure 132, but it is not limited thereto.

In other embodiments, the area of the touch-sensing structure of the touch-sensing cover can be smaller than the area of the panel. In other words, the area of the touch-sensing structure and the area of the panel have a ratio relationship, and the ratio relationship is applied for the control unit to convert a touch point on the touch-sensing cover to a display position of the panel.

When the user performs the touch operation on the touch-sensing cover 13 by finger for example, the panel 11 can display the corresponding operative instruction according to the user's operation gesture (or called the hand gesture), the control unit 12 will convert the input position of the touch-sensing structure 132 into the display position of the panel 11, and the panel 11 will display a visible sign on the display position so that the user can interact with the graphical user interface displayed on the panel 11. Here, the visible sign for example can be a dialog.

Besides, a wiring connecting to the touch-sensing structure 132 is gathered to a single side for wiring outlet, and then electrically connected with a circuit board, so as to enhance the flexibility of the circuit design.

Additionally, the wireless communication unit for example comprises infrared module, bluetooth module, zigbee module, radiofrequency module or NFC (near field communication) module. The wireless communication unit has a wireless communication chip and an antenna. The wireless communication chip is electrically connected to the control unit 12. The antenna can be disposed on the cover 131 or integrated with the touch-sensing structure 132, and it is not limited thereto. When the user want to wirelessly communicate with the monitor 2 or the wireless access point 3, for example by NFC, he can take the hand-held electronic device 1 close to the monitor 2 or the wireless access point 3 to receive data from or transmit data to the monitor 2 or the wireless access point 3 through the antenna and the wireless communication chip.

As to the hand-held electronic device 1 in the embodiment, the user can perform touch operation on the touch-sensing cover 13 by finger for example, and the panel 11 can display the corresponding operation according to the user's operation gesture (or called the hand gesture), and thereby the user can interact with the graphical user interface displayed on the panel 11. For example, when the user's finger slides on the touch-sensing cover 13, the panel 11 will display a corresponding cursor (such as an arrow or hand shape) which slides correspondingly. Herein for example, the touch control can be implemented by the user's finger or stylus contacting or nearly contacting the touch-sensing cover 13. Moreover, the interaction with the graphical user interface can be, for example, that the user touches the touch-sensing cover 13 by the finger to click, zoom out or move. For example, when the user's finger clicks the touch-sensing cover 13 at a position, the panel 11 will execute the item corresponding to the position information. Thus, it is not necessary to operate on the panel 11 of the hand-held electronic device 1. Directly controlling on the touch-sensing cover 13 and executing the item displayed on the panel 11 will have similar effect in comparison to operating on the panel. Besides, the user will not be shaded from his finger during operation on the touch-sensing cover 13 (in other words, the result of shadeless touch). Moreover, it is convenient to operate by one hand, in comparison with the conventional art where just the user's thumb can be used in the single-hand operation, the operation on the touch-sensing cover 13 by the forefinger or middle finger can provide more flexibility and a new user experience about the single-hand holding.

The touch or touch control can comprise an operation gesture or hand gesture, such as a single tap or multiple taps, a single slide or multiple slides (such as a rightward, leftward, upward or downward slide), sequential taps by multiple fingers or concurrent slides of multiple fingers, etc. Besides, the operative action in response to the hand gesture can be configured with factory default of the hand-held electronic device 1 and/or edited by various users' habits.

Moreover, in addition to being disposed on the cover body 1311 and the sidewall 1312, the touch-sensing structure 132 also can be disposed at other places of the hand-held electronic device 1 which won't shade the panel 11, such as the top surface and bottom surface on demands. Therefore, when the user performs the operation on the touch-sensing cover 13 as shown in FIG. 1, the display of the panel 11 won't be shaded by the fingers and the erroneous touch can be thus avoided. Besides, other advantages of providing the touch-sensing cover 13 for the user's touch operation include that the touch-sensing cover 13 needn't be made by the transparent touch-sensing material (such as ITO) for matching the display performance of the panel 11, and therefore the material selection will be more flexible and the cost can be easily controlled. Furthermore, no metal interference fringe will be caused to affect the readability of the display panel, and the performance and convenience of the manual operation will not be lowered down.

The touch-sensing structure 132 can also yield to the position of the camera lens or the flash of the cover 131, so there is no touch-sensing structure 132 allocated at a local region of the first portion P1 (namely the position of the camera lens or the flash). The local region refers to inside of the first portion P1 or the edge of the first portion P1. In one embodiment, a circuit board, a battery or a memory card may be further included between the touch-sensing cover 13 and the panel 11.

The touch-sensing structure 132 can be disposed on the inner surface of the cover 131 facing the panel 11 (inside the hand-held electronic device 1), or disposed on the outer surface of the cover 131 away from the panel 11 (outside the hand-held electronic device 1), or simultaneously disposed on the inner surface of the cover 131 facing the panel 11 and the outer surface of the cover 131 away from the panel 11 (inside and outside the hand-held electronic device 1). The touch-sensing structure 132 in the embodiment can be for example capacitive touch-sensing structure. It is formed on the inner surface of the cover 131 facing the panel 11, and directly formed on the cover body 1311 and two sidewalls 1312 for example. In various embodiments, when the touch-sensing structure 132 is disposed on the outer surface of the cover 131 away from the panel 11, an additional protection layer is required to protect the touch-sensing structure 132. It is noted that the cover 131 can be glass, plastic, metal or other material, and it can be a part of the total structure of the hand-held electronic device 1. In other words, the touch-sensing cover 13 is not an additional component (such as the protection case or protection sheath of the electronic device). Therefore, if the touch-sensing cover 13 is separated from the hand-held electronic device 1, the inside parts of the hand-held electronic device 1 for example battery or IC (integrated circuit), etc. can be seen. In addition, the touch-sensing structure 132 can also comprise a driving circuit and a sensing circuit (i.e. the so-called Tx and Rx by the skilled person in the art, not shown in the figure), and it can be a conductive layer (it may also be a transparent conductive layer, for example indium tin oxide (ITO), indium zinc oxide (IZO), fluorine-doped tin oxide (FTO), Al-doped ZnO, Ga-doped ZnO), metal mesh, metal nanowires, transparent conducting film, carbon nanotube or graphene, but it is not limited thereto. If the graphene is the material of the touch-sensing structure 132, Tx and Rx can be utilized to a wireless power transmission (for example wireless charging).

If the touch-sensing structure 132 is made by metal mesh, the metal texture effect can be exhibited on the appearance when the touch-sensing structure 132 is disposed on the outer surface (not the display surface) of the cover 131. Accordingly for example, the cover of metal texture is implemented by disposing the touch-sensing structure 132 composed of the metal mesh on the outer surface (not the display surface) of the cover 131 made by non-metal material. Thus, the metal-made cover (requiring a more complicated process) is unnecessary to be used, so as to reduce cost.

In some embodiments, the hand-held electronic device 1 can further comprise another touch-sensing structure (not shown in the figure). Another touch-sensing structure can be disposed on the panel 11 so the panel 11 becomes a touch display panel. Therefore, in addition to performing shadeless touch operation on the cover 131 by the user, another touch-sensing structure also provides another operation interface for communicating with the device. Thus, the user can choose to perform shadeless touch operation on the cover 131, or alternatively operate the hand-held electronic device 1 directly on the touch display panel, or alternatively operate the hand-held electronic device 1 concurrently on the touch-sensing cover 131 and the touch display panel.

When the user wants to utilize the hand-held electronic device 1 as a mouse function of the electronic apparatus 2 (for example the monitor 2), the hand-held electronic device 1 can perform online connection with the electronic apparatus 2 (performing the online connection with the wireless unit 21 of the electronic apparatus 2 by the wireless communication unit 16). After the online connection is established successfully, the hand-held electronic device 1 can act as a mouse of the electronic apparatus 2, and thus the electronic apparatus 2 can be operated by the input action on the touch-sensing cover 13. The input action can trigger partial detection points of the touch-sensing structure 132, and it includes for example utilizing the middle finger to imitate the right click of the real mouse or utilizing the forefinger to imitate the left click of the real mouse on the cover 131 like slide, single click or double click, etc.

Referring to FIG. 2A to FIG. 2C, the control unit 12 is disposed on the circuit board which is disposed inside the hand-held electronic device 1, and it can be composed of one processor or multiple processors. The control unit 12 can control not only the content displayed on the panel 11 but also the operation or action of the touch-sensing cover 13. The memory unit 14 is a storing medium of the hand-held electronic device 1, and it can be the memory inside the hand-held electronic device 1 or outside the hand-held electronic device 1 (such as the cloud memory or cloud storage), but it is not limited thereto. The memory unit 14 can comprise, for example, ROM (Read-Only Memory), RAM (Random Access Memory), flash memory, FPGA (field-programmable gate array) or other kinds of memory, and it is not limited thereto. Therefore, one or more programs can be stored in the memory unit 14 and it is adapted to be executed by the control unit 12 (may include one or more processors). Furthermore, the memory unit 14 also can store the operation system, application programs, data processing programs and electronic data of various formats, etc. The operation system is the program managing the computer hardware and software resources. The application program can be a document processing program, email program, etc. In the embodiment, the control unit 12 comprises a CPU (central processing unit) for example, and the control unit 12 executes these programs.

In other embodiments, the hand-held electronic device 1 further comprises a charging module 15, and the wireless access point 3 can transmit a wireless charging energy to the charging module 15. In detail, the charging module 15 can comprise at least one charging coil, a rectifier and a voltage regulating circuit. The rectifier and the voltage regulating circuit are coupled to the control unit 12. The wireless access point 3 transmits a wireless charging energy so as to change the magnetic field and electric field around the hand-held electronic device 1. Thus, the electric energy can be generated in the charging coil and provided for the hand-held electronic device 1 to charge through the rectifier and the voltage regulating circuit.

In one embodiment, the wireless access point 3 can further comprise a high-frequency oscillator. After the power signal is converted to a high-frequency signal by the high-frequency oscillator, the high-frequency signal is transmitted to the charging module 15. After the energy is transmitted to the charging module 15, it is converted to a direct current by the rectifier and provided for the hand-held electronic device 1 to charge.

In one embodiment, the wireless access point 3 can further comprise a magnetically coupled resonators which utilizes the principle that two resonance objects of the same frequency can produce strong reciprocal coupling, so that two coils characterized by LC Resonant circuit load a coil of the wireless access point 3 with several MHz alternating current resulting in an electromagnetic field around it. By the resonance due to the Electromagnetic induction between the two coils, power is delivered to another coil at the hand-held electronic device 1. Thus, wireless power transmission is achieved to charge the hand-held electronic device 1.

Besides, the hand-held electronic device 1 in the embodiment further comprises a wireless communication unit 16. The wireless communication unit 16 is electrically connected to the control unit 12. The wireless communication unit 16 of the hand-held electronic device 1 is wirelessly connected to the wireless unit 21 of the monitor 2. The wireless communication unit 16 or the wireless unit 21 can comprise infrared module, bluetooth module, zigbee module, radiofrequency module, NFC module, and they are not limited thereto.

Additionally, the NFC module has a NFC chip and an antenna. The NFC chip is electrically connected to the control unit. The antenna can be disposed on the cover or the touch-sensing structure, and it is not limited thereto. When the user want to communicate with another electronic device through NFC, he can take the hand-held electronic device close to another electronic device capable of NFC, so the antenna and the NFC chip are utilized to transmit or receive the electronic data to or from another electronic device.

Therefore, the input action by the user can make the control unit 12 to control the wireless communication unit 16 to transmit the display information. The display information can be received by the wireless unit 21, so the monitor 2 can display the received display information (or through the wireless communication unit 16). The display information can be image information, picture information or text information, and it is not limited thereto.

Thus, the image, text or video can be displayed on the monitor through the hand-held electronic device 1. For example, referring to FIG. 3, the hand-held electronic device 1 can have APP (mobile application) software. When the user on the touch-sensing cover 13 performs touch control corresponding to the icon displayed on the panel 11, the touch input action can execute the APP software corresponding to the icon, and transmit the display screen of the hand-held electronic device 1 to the monitor. In other words, the monitor 2 acts as an additional display screen.

Alternatively, referring to FIG. 4A to FIG. 4C, the hand-held electronic device 1 can be placed on a plane, an input action is taken through the touch-sensing cover 13, and its touch input action will be transmitted to the monitor 2 through the wireless communication unit 16. In other words, the monitor 2 is utilized to display and the hand-held electronic device 1 is utilized to input. FIG. 4A to FIG. 4C are schematic diagrams showing multiple fingers of the user contact the touch-sensing cover 13. The actual manners of the fingers contacting the touch-sensing cover 13 or the quantity of contacted fingers are not limited to the figure.

Moreover, in one embodiment where the hand-held electronic device 1 is used in the strong light environment such as the outdoor sunlight or indoor high-illuminance light, the user can operate the hand-held electronic device 1 by one hand while the touch-sensing cover 13 faces the light source of the strong light environment (the panel 11 faces the user) and the back of the panel 11 faces the light source of the strong light environment (against the light), so the touch-sensing cover 13 can block the strong light source. Thereby, the visibility can be enhanced and the user can continue the single-hand operation. Furthermore, the user can hold the device by one hand and also perform the input operation with the forefinger and/or the middle finger the same hand, so as to enhance the single-hand operation performance of the hand-held electronic device 1 under the strong light source (such as the sunlight). Besides, in comparison with the conventional art where just the thumb can be used in the single-hand operation, the operation on the touch-sensing cover 13 by the forefinger or middle finger can provide more flexibility and a new user experience about the single-hand holding and multi-finger touch operation.

In addition, although both the hand-held electronic device 1 and the monitor 2 display the same content for example in the embodiments, alternatively the user may set that partial screen or designate information is executed on the monitor 2 and it is not limited thereto.

In addition, although the embodiment illustrates the operation is performed on the cover body 1311 of the cover 131, in other embodiments, the operation of multiple fingers may be performed on the cover body 1311 and the sidewall 1312 and it is not limited to the figures.

In addition in the embodiment, the wireless access point 3 may keep enabled continuously, and the wireless access point 3 can be connected to a commercial power or a charging device. Similarly, the monitor 2 can be also connected to a commercial power or a charging device. The hand-held electronic device 1 can be connected with the wireless access point 3 by automatic identification and authentication so as to ensure the security of data transmission.

The following will explain the application of the touch-sensing cover of the hand-held electronic device.

Figure 5:
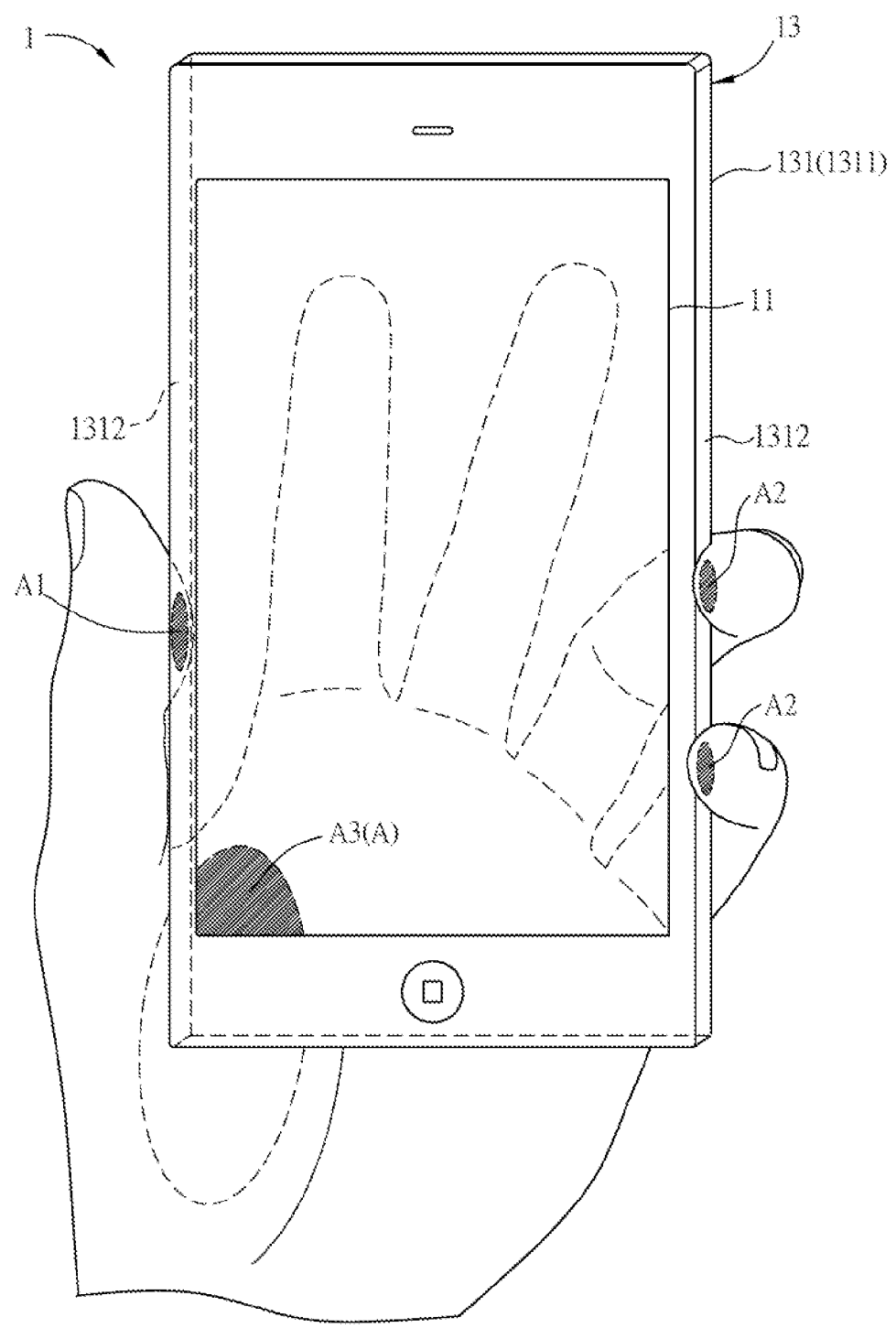
FIG. 5 is a schematic diagram showing the touch-sensing cover of the hand-held electronic device in FIG. 1 is triggered.
Figure 6:
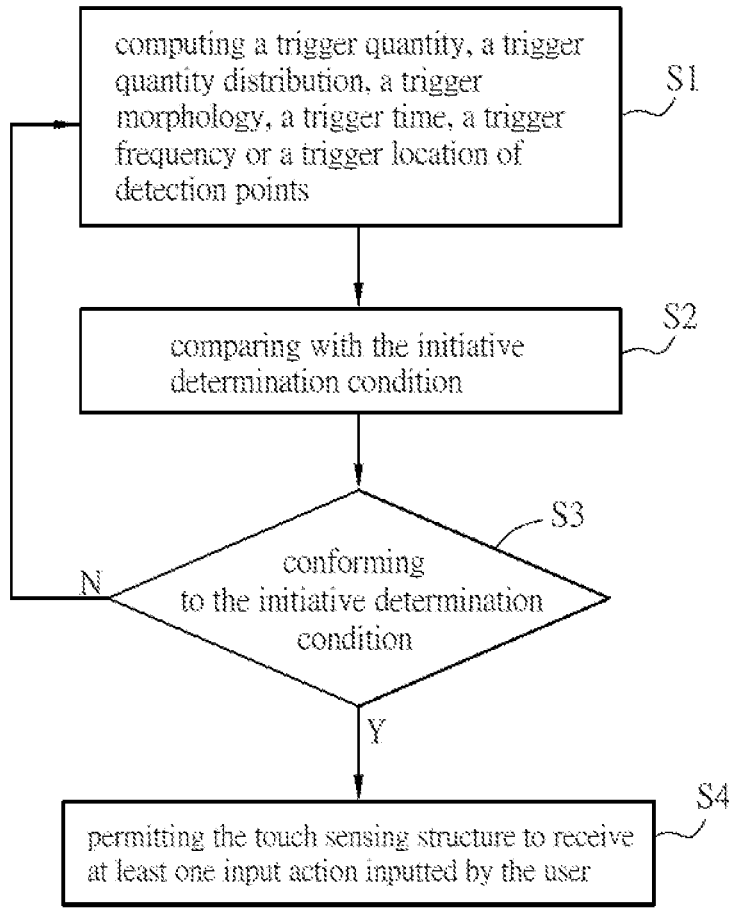
FIG. 6 is a flow chart showing the touch-sensing cover in FIG. 5 is triggered.

Referring to FIG. 5 and FIG. 6, FIG. 5 is a schematic diagram showing the touch-sensing cover of the hand-held electronic device in FIG. 1 is triggered, and FIG. 6 is a flow chart showing the touch-sensing cover in FIG. 5 is triggered.

When the user operates the hand-held electronic device 1, the user's holding habit can be predefined. The hand-held electronic device 1 is determined whether to initiate and execute the later input action according to the trigger event detected by the touch-sensing structure 132.

The touch-sensing structure 132 has a plurality of detection points. In detail, first, a trigger quantity, a trigger quantity distribution, a trigger morphology (which can refer to trigger appearance), a trigger time, a trigger frequency or a trigger location (which can refer to trigger position) of the detection points is computed (step S1). The control unit 12 can analyze the trigger quantity, the trigger quantity distribution, the trigger morphology, the trigger time, the trigger frequency or the trigger location of the detection points which is triggered by the user on the operation setting interface, and define it to be the initiative determination condition and save it in the memory unit 14. In other words, the user's holding position or personal habit and so on during operating the hand-held electronic device 1 is defined as the initiative determination condition.

Taking FIG. 5 for example, when the user holds hand-held electronic device 1, the control unit 12 can analyze the position of the detection point triggered at the holding location, and define the region where the number of the adjacent triggered detection point is larger than a predetermined value as a trigger zone A. In this embodiment, the trigger quantity distribution of the detection points is that one sidewall 1312 has a trigger zone A1, the other sidewall 1312 has two trigger zones A2, and the cover body 1311 has a trigger zone A3. In other words in this embodiment, the trigger quantity distribution and the trigger location respectively indicate the quantity and location of each trigger zone, and the trigger morphology indicates the shape or appearance of each trigger zone A, i.e. the shapes or appearance of the trigger zones A1, A2 and A3. Moreover, the trigger frequency indicates the click frequency at some certain locations, and the trigger time indicates that the holding time exceeds a certain time or is related to the user's living habit.

After configuration, the control unit 12 computes the trigger quantity, the trigger quantity distribution, the trigger morphology, the trigger time, the trigger frequency or the trigger location of the detection points on the touch-sensing cover 13 with an interval in a predefined time period. Thus, assuming that the user's hand contacts the touch-sensing cover 13, after the control unit 12 receives the touch signal, it can compute the trigger quantity, the trigger quantity distribution, the trigger morphology, the trigger time, the trigger frequency or the trigger location of the triggered detection points and compare the computed trigger quantity, trigger quantity distribution, trigger morphology, trigger time, trigger frequency or trigger location with the initiative determination condition pre-stored in the hand-held electronic device 1 (step S2).

If the trigger quantity, the trigger quantity distribution, the trigger morphology, the trigger time, the trigger frequency or the trigger location conforms to the initiative determination condition (step S3), the touch-sensing structure 132 is permitted to receive at least one input action inputted by the user (step S4). Then, the monitor 2 is controlled according to the input action. In other words, the trigger quantity, the trigger quantity distribution, the trigger morphology, the trigger time, the trigger frequency or the trigger location must satisfy the initiative determination condition first, then the control unit 12 executes or starts to execute other action and it permits the user correspondingly control the monitor 2 by the touch-sensing structure 132 receiving the touch input for control.

Therefore, when another user holds the hand-held electronic device 1 and would like to operate it, he fails to operate the hand-held electronic device 1 because the trigger quantity, the trigger quantity distribution, the trigger morphology, the trigger time, the trigger frequency or the trigger location does not conform to the initiative determination condition which the original user has predefined. Therefore, the security of the hand-held electronic device 1 is enhanced.

It is also noted that if the trigger morphology indicates multiple area contacts, it is determined not to conform to the initiative determination condition. Here, multiple means two or more than two. In the embodiment, "area contact" means that the diameter of a single touch area on the touch-sensing cover 13 which the user contacts or the longest distance from one touch edge to the other touch edge is longer than 7 mm. The above configuration is based on the condition that it is easy to generate the trigger morphology indicating multiple area contacts when the user does not perform touch operation on the hand-held electronic device 1 and he only simply holds the hand-held electronic device 1, and thus such the trigger event is determined not to conform to the initiative determination condition.

In one embodiment, the trigger morphology of the trigger event indicates the position of the single area contact which is used for determination. For example, if the position of the single area contact is located at the upper half of the hand-held electronic device 1, it is determined not to conform to the initiative determination condition. The above configuration is based on the condition that when the user regularly holds the hand-held electronic device 1 and utilizes his finger to perform touch operation on the touch-sensing cover 13, the palm of the user may form a trigger zone of area contact on the lower half of the hand-held electronic device 1, and the trigger zone of area contact is not formed on the upper half. The diameter of the touch region formed on the upper half by the touch-sensing cover 13 and the finger performing the touch operation or the longest distance from one touch edge to the other touch edge is usually not longer than 7 mm. When a single area contact occurs on the upper half of the hand-held electronic device 1, it is very possible that the user does not perform touch operation but for example wipes the cover or merely holds the hand-held electronic device 1 instead. Here, to distinguish between the upper half and the lower half can depend on the center of the cover 131 or the center of the touch-sensing structure 132, it still depends on actual situation when the user operates the hand-held electronic device 1. The portion upper than the center is regarded as the upper half, and the portion lower than the center is regarded as the lower half.

In other embodiments, the hand-held electronic device 1 can further comprise a fingerprint recognition unit (not shown), which is electrically connected with the control unit 12 and can recognize the fingerprint of at least one finger. Therefore, the user can store the fingerprint thereof in the memory unit 14 in advance, and before activating the hand-held electronic device 1, the user can contact. For example, a designate area of the cover body 1311 of the touch-sensing cover 13 by finger, and the control unit 12 can compare the fingerprint in the designate area with the pre-stored fingerprint. If the fingerprints conform to each other, the hand-held electronic device 1 can be activated to receive the user's input action. If the fingerprints do not conform to each other, the control unit 12 will determine that the user is not a permitted user so that the hand-held electronic device 1 can not be activated. In some embodiments, the hand-held electronic device 1 can further comprise a palmprint recognition unit (not shown), which is electrically connected with the control unit 12 and can recognize at least a part of the palmprint of the user. Therefore, the user can store the palmprint thereof in the memory unit 14 in advance, and before activating the hand-held electronic device 1, the user can contact, for example, a designate area of the cover body 1311 of the touch-sensing cover 13 by palmprint, and the control unit 12 can compare the palmprint in the designate region with the pre-stored palmprint. If the palmprint conform to each other, the hand-held electronic device 1 can be activated to receive the user's input action. If the palmprint does not conform to each other, the control unit 12 will determine that the user is not a permitted user, such that the hand-held electronic device 1 is not activated. The above input action includes, for example, opening a webpage, reading the email content, executing APPs, etc., and it is not limited thereto.

In one embodiment, the hand-held electronic device 1 further comprises a charging module, and the monitor 2 can transmit a wireless charging energy to the charging module. In detail, the charging module can comprise at least one charging coil, a rectifier and a voltage regulating circuit. The rectifier and the voltage regulating circuit are coupled to the control unit 12. The monitor 2 transmits a wireless charging energy so as to change the magnetic field and electric field around the hand-held electronic device 1. Thus, the electric energy can be generated in the charging coil and provided for the hand-held electronic device 1 to charge through the rectifier and the voltage regulating circuit.

In one embodiment, the monitor 2 can further comprise a high-frequency oscillator. After the power signal is converted to a high-frequency signal by the high-frequency oscillator, the high-frequency signal is transmitted to the charging module. After the energy is transmitted to the charging module, it is converted to a direct current by the rectifier and provided for the hand-held electronic device 1 to charge.

In one embodiment, the monitor 2 can further comprise a magnetically coupled resonators which utilizes the principle that two resonance objects of the same frequency can produce strong reciprocal coupling, so that two coils characterized by LC Resonant circuit load a coil of the monitor 2 with several MHz alternating current resulting in an electromagnetic field around it. Due to the Electromagnetic induction between the two coils, power is delivered to another coil at the hand-held electronic device 1 by the resonance. Thus, the wireless power transmission is achieved to charge the hand-held electronic device 1.

Figure 7:
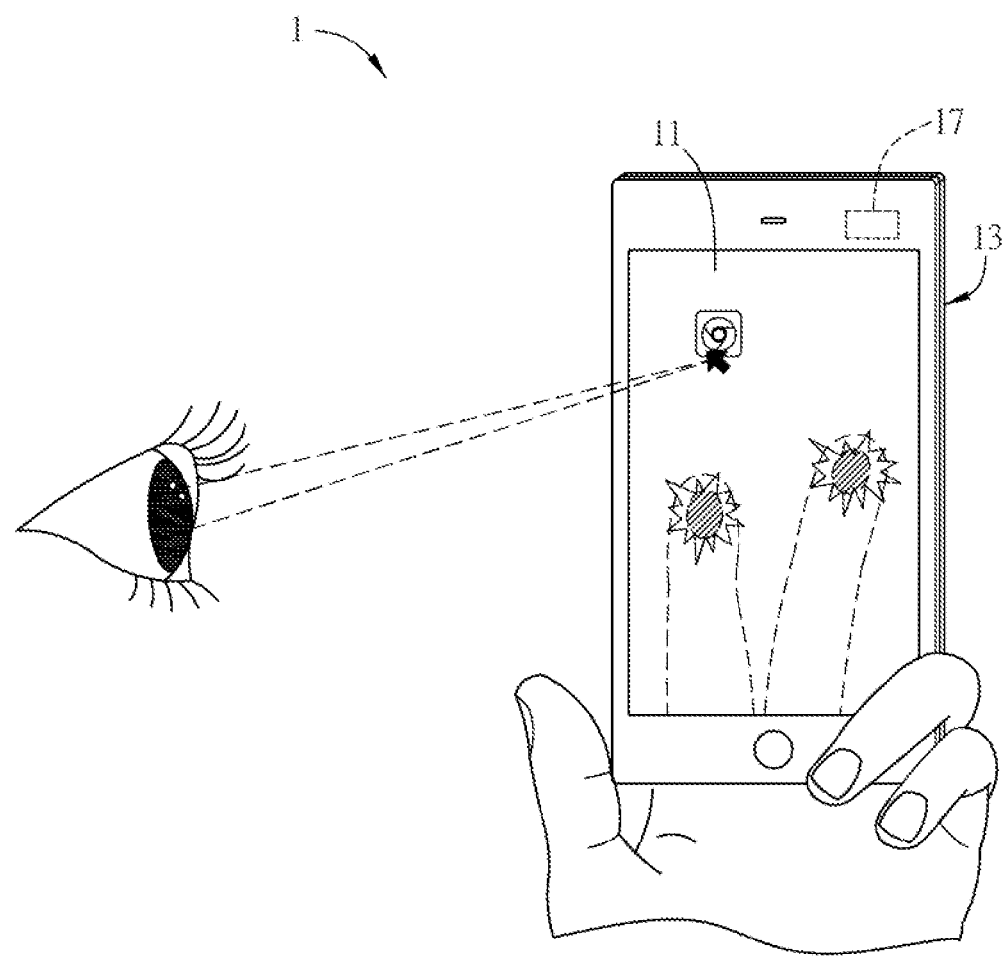
FIG. 7 is another schematic diagram showing the operation of the hand-held electronic device according to the embodiment of the invention.

Referring to FIG. 7, FIG. 7 is another schematic diagram showing the operation of the hand-held electronic device according to the embodiment of the invention.

In the embodiment, in addition to the panel 11 and the touch-sensing cover 13 as mentioned above, the hand-held electronic device further comprise an eyeball tracking module 17.

In the embodiment, the eyeball tracking module 17 can be an eye tracker, a capture device (for example camera), or an infrared detection device. It can detect eyeball information of the user. The eyeball tracking module 17 acquires the eyeball information which can be an eye image, eye coordinates or their combination for example. The eyeball information which is acquired by the eyeball tracking module 17 corresponds to the position information on the panel 11, and the position information corresponds to an object displayed on the panel 11.

To be noted, the position information is unnecessary to be completely the same as the focus of the eyes of the user, and it can be modified to provide the position of the object which is closest to the focus of the user's eyes. The user can select the object for the convenience and the position information will be automatically modified to provide the position of the nearest object.

Besides, the panel 11 can display an arrow for example at the location corresponding to the position information (FIG. 7) so that the user can know the current location corresponding to the position information. When the eyeball information of the user is changed, the position information (arrow) on the panel 11 will move correspondingly.

Figure 8A:
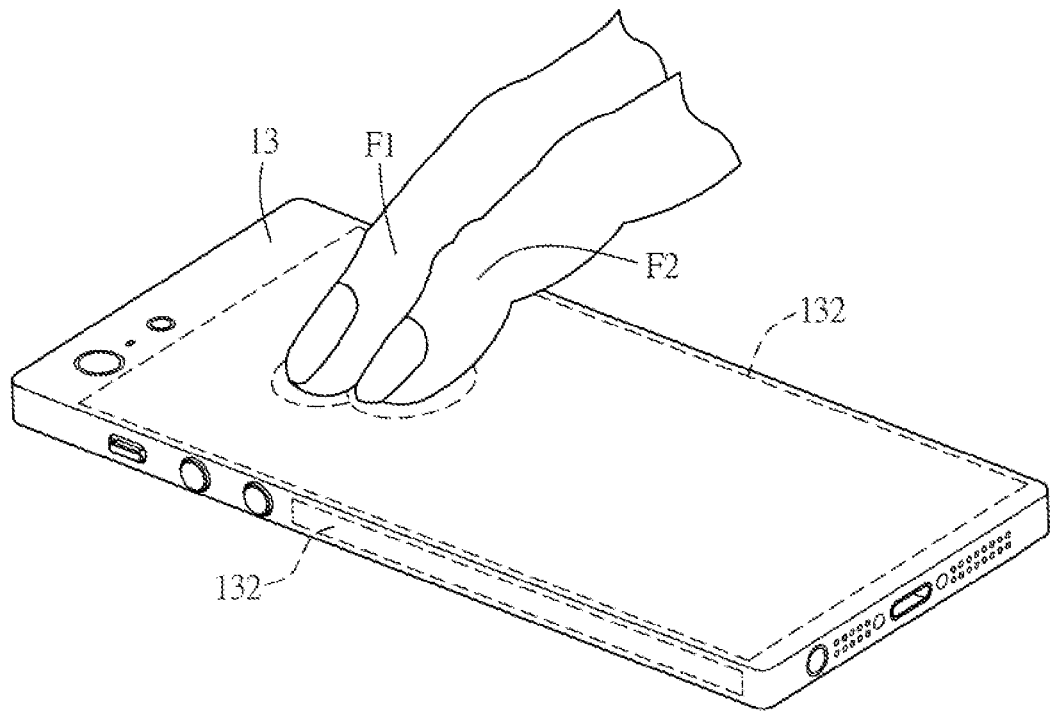
FIG. 8A is a schematic diagram showing two fingers operate the touch-sensing cover.
Figure 8B:
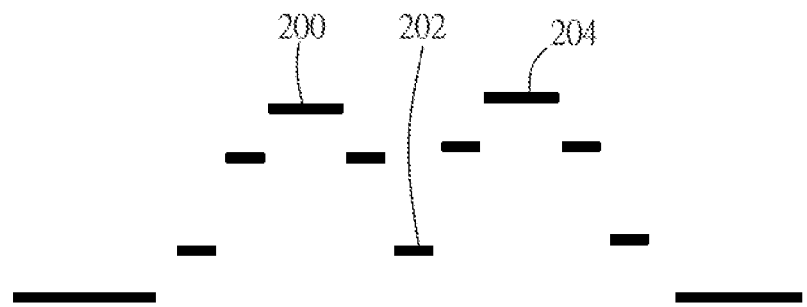
FIG. 8B is a schematic diagram showing the capacitance variation between the two non-overlapping fingers after scanning the touch-sensing structure.

Then, referring to FIG. 8A to FIG. 8B, FIG. 8A is a schematic diagram showing two fingers operate the touch-sensing cover. FIG. 8B is a schematic diagram showing the capacitance variation between the two non-overlapping fingers after scanning the touch-sensing structure.

The following will explain that the touch-sensing structure 132 of the cover 13 generates corresponding operation through the multiple finger input. FIG. 8A is a schematic diagram showing multiple fingers contact the touch-sensing cover 13. The actual manner about the fingers contacting the touch-sensing cover 13 or the quantity of contacted fingers is not limited to the figure. Although the embodiment illustrates the operation is performed on the side of the touch-sensing cover 13 opposite the display surface, in other embodiments, the operation of multiple fingers may be performed on the lateral surface of the touch-sensing cover 13 and it is not limited to the figures.

In the embodiment, the middle finger F1 and the forefinger F2 act as operation fingers for example. When the middle finger F1 and the forefinger F2 simultaneously contact the touch-sensing structure 132, the capacitance detection unit can detect a first peak value 200 and a second peak value 204. The first peak value 200 is the variation of the coupling capacitance corresponding to the middle finger F1 on the touch-sensing structure 132, and the second peak value 204 is the variation of the coupling capacitance corresponding to the forefinger F2 on the touch-sensing structure 132. Between the first peak value 200 and the second peak value 204 is a trough value 203, which is correspondingly generated by the interval between the two fingers. Therefore, by detecting the time divergence between the occurrences of the first peak value 200 and second peak value 204 of the variation of the coupling capacitance or detecting the synchronous or relative motion between the fingers, etc. Accordingly, the finger input gesture of the user can be determined, and the resulted finger input signal can be transmitted to the control unit 12 for the corresponding operation. Those skilled in the art should comprehend that if the number of the operation fingers is increased, the numbers of the peak value and tough value between the peaks and the applicability can be correspondingly increased.

Moreover, although the trough value 202 shown in FIG. 8B is a nonzero variation of the coupling capacitance, the tough value 202 also may be zero in other embodiments, and the trough value 202 will be varied with the different interval between the adjacent fingers.

Figure 9:
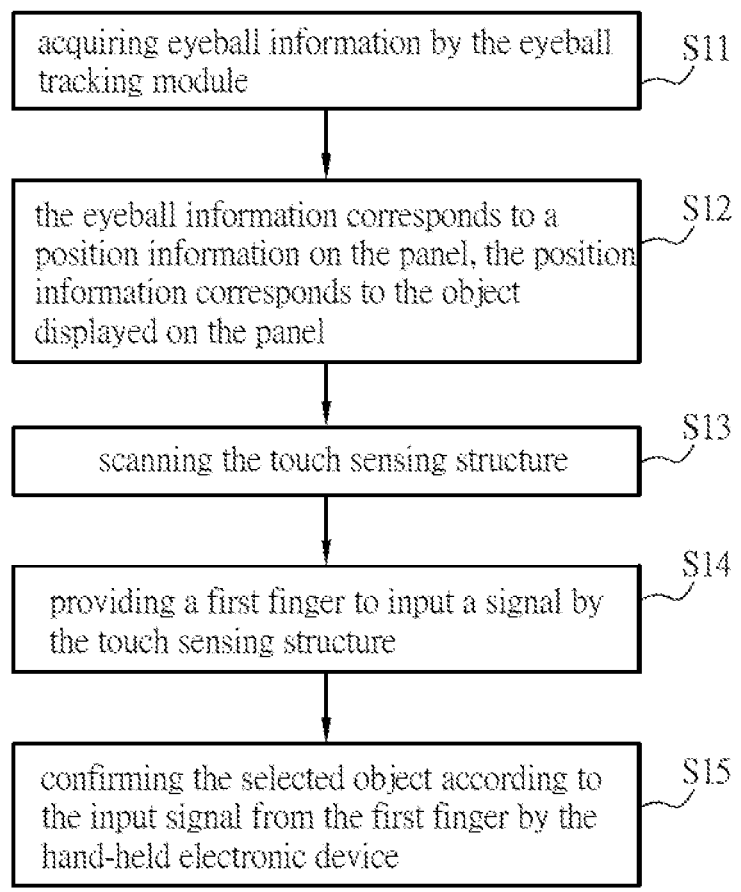
FIG. 9 is a flow chart showing the method of detecting finger input according to the embodiment of the invention.
Figure 10A:
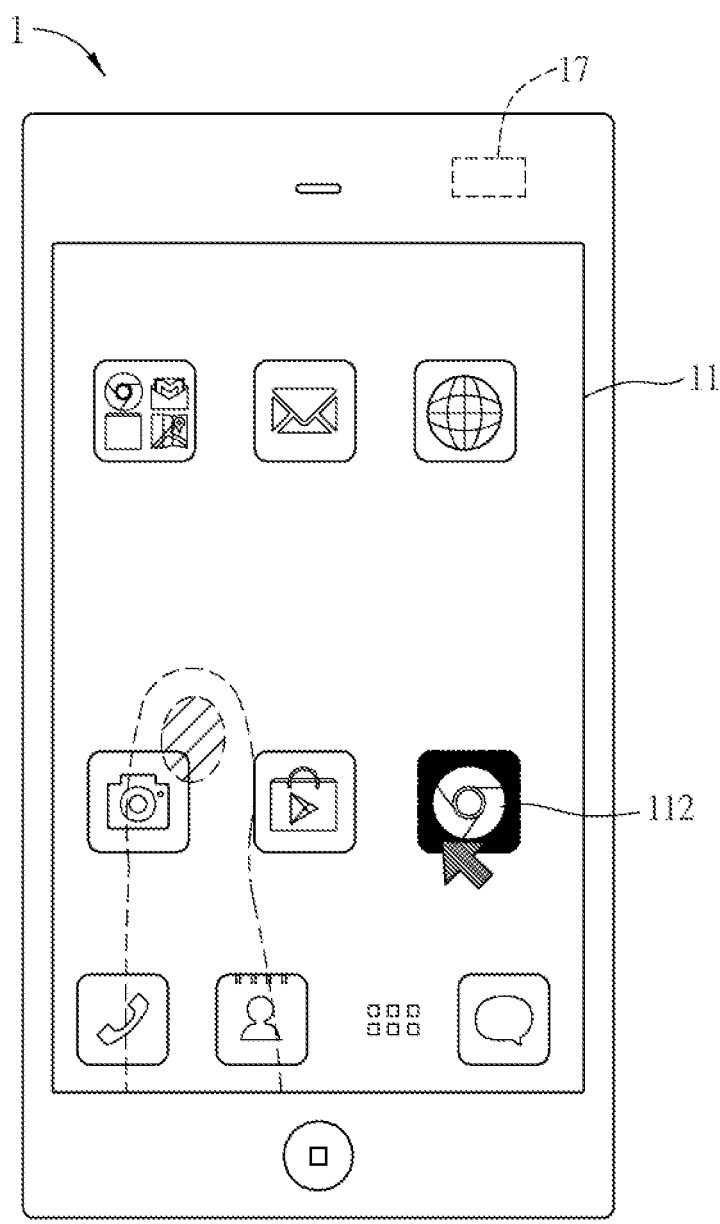
FIG. 10A to FIG. 10C are schematic diagrams showing the action of detecting finger input according to the embodiment of the invention.
Figure 10B:
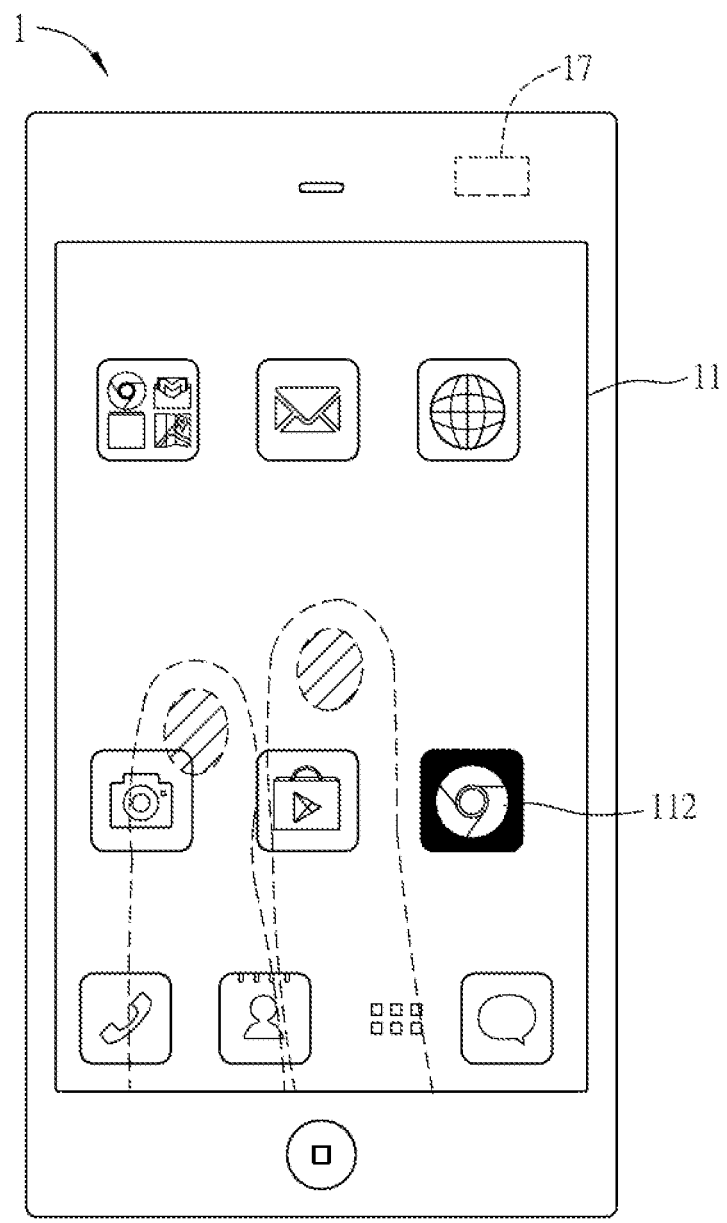
Figure 10C:
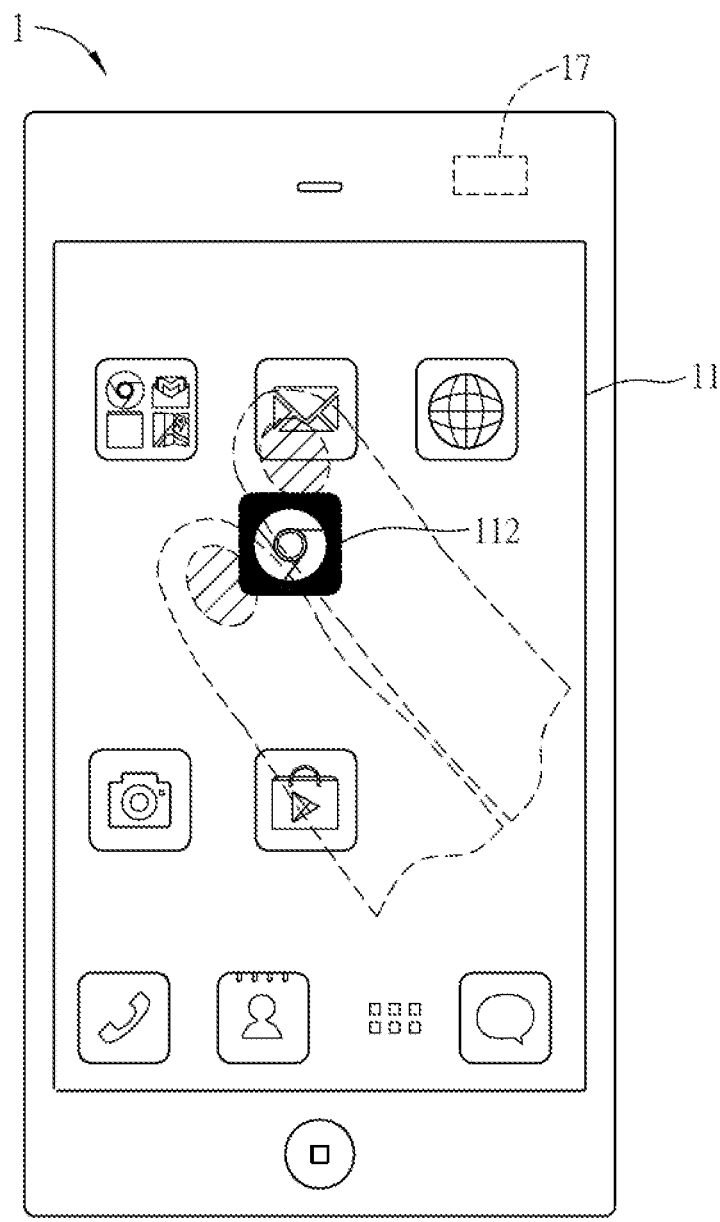

Accordingly, by the sequential or simultaneous contact or motion of the multiple fingers on the touch-sensing structure 132 together with the eyeball tracking module, various operations can be performed on the touch-sensing cover 13, and the user's view will not be shaded by the fingers during the operation Then, referring to FIG. 9 to FIG. 10C, FIG. 9 is a flow chart showing the method of detecting finger input according to the embodiment of the invention, and FIG. 10A to FIG. 10C are schematic diagrams showing the action of detecting finger input according to the embodiment of the invention.

As to the following operation gesture (or hand gesture), they are the touch operation gestures implemented by the user's finger on the touch-sensing cover 13.

The method of detecting finger input in the embodiment can be applied to the hand-held electronic device 1 mentioned previously but not limited thereto. The method of detecting finger input which is executed by the hand-held electronic device 1 comprises following steps. The eyeball information is acquired by the eyeball tracking module 17 (step S11). The eyeball information for example can be an eye image, an eye coordinates or their combination. Then, the eyeball information corresponds to a position information on the panel 11, and the position information corresponds to the object 112 displayed on the panel 11 (step S12).

The object 112 can be an icon for example which corresponds to an application program. The position information in the embodiment can be correspondingly shifted to the closest position to the object 112 from the position information. But some embodiment may not implement this modification.

Then, the touch-sensing structure 132 is scanned (step S13), so as to detect the variation of the coupling capacitances between the first sensing lines and the second sensing lines of the touch-sensing structure 132. When a finger contacts the touch-sensing structure 132 (clicks or tap), the coupling capacitance changes and the touch-sensing structure 132 provides a first finger to input a signal (step S14). The input signal from the first finger will be transmitted to the processing unit (control unit 12).

Then, the hand-held electronic device 1 will confirm, according to the input signal from the first finger, the selected object (step S15). At the moment, receiving the input signal from the first finger is regarded as confirming that the corresponding object of the position information (arrow) is the object to be selected. The object to be selected can be given a visible sign (such as a color change). In other embodiments, the visible sign also can be a dialog, a shape change (such as enlargement), a flash of the selected object, or a displayed sign near the selected object, etc.

The step S5 in the embodiment may also comprise: confirming the selected object and executing the application program corresponding to the selected object according to the input signal from the first finger by the hand-held electronic device 1. In other words, when the touch-sensing structure 132 detects the variation of the coupling capacitance caused by for example a click or double clicks, the application program corresponding to the object corresponding to the position information will be executed. For example in the embodiment, after a single click for selecting the browser shortcut icon, the browser will be executed.

In the situation of the multi-finger input, the step in the embodiment further comprises: providing a second finger input signal by the touch-sensing structure 132, and dragging the object according to the second finger input signal. Referring to FIG. 10B and FIG. 10C, after the user additionally using another finger to contact the touch-sensing structure 132 (at this time, the touch-sensing structure 132 receives two touch signals), the control unit 12 will regard the executed action of the finger input signals inputted at two sequential timings as "moving the selected object". So, when two fingers continuously contact and move on the touch-sensing structure 132, the object will also move in response to the moving path of the two fingers.

To be noted, this embodiment just illustrates the operation manners on the touch-sensing structure 132 by one or multiple fingers, but those skilled in the art can develop various operation manners accordingly.

In other embodiments, in addition to the icon, the objects displayed by the display device also include structured electronic documents. In this embodiment, the method of detecting finger input further comprises following steps of: providing a second finger input signal by the touch-sensing structure 132, and correspondingly rolling, translating, shrinking, enlarging the displayed portion of the structured electronic document according to the second finger input signal. For example, when the multi-finger open/close gestures are detected, the displayed portion of the structured electronic document can be enlarged. Contrarily, in response to the multi-finger open/close gestures, the displayed portion of the structured electronic document can be reduced in size. Moreover, in some embodiments, in response to the upward (or downward) sliding gesture of the user, the webpage (or other electronic documents) can roll upward (or downward) vertically in one dimension. For example, in response to the upward sliding gesture of the user within a predetermined angle range from the verticality, the webpage can roll upward vertically in one dimension.

Contrarily, in some embodiments, in response to the sliding gesture out of the predetermined angle range from the verticality, the webpage can roll in two dimensions (for example, the webpage moves in a vertical direction and a horizontal direction at the same time). For example, in response to the upward sliding gesture of the user out of the predetermined angle range from the verticality, the webpage can roll in two dimensions along the direction of the sliding gesture.

After moving the eyeball tracking module to the object to be select, inputting by different finger on the touch-sensing cover can solve the disadvantage of shading the user's view during operation. Such utilizing the eyeball tracking module together with utilizing the touch-sensing cover to input can strengthen user privacy protection, for example the password will not be peeped by others behind the user when inputting, Therefore it can reduce the cost of the touch-sensing structure, improve performance and convenience of the manual operation and realize a better user experience.

The hand-held electronic device and the wireless access point transmit data by the wireless connection, so the hand-held electronic device and the monitor through the wireless access point forming a system in which they can communicate and connect with mutually. Thus, even if the monitor of the smart internet system is not directly wirelessly connected to the hand-held electronic device, by the relay wireless access point and at the common communication platform of the wireless access points, the hand-held electronic device can effectively be linked up with at least one monitor mutually and they can synchronously share display information, so as to implement one-to-one or one-to-many tasks or share with friends everywhere by multipoint.

The hand-held electronic device and the monitor of the smart monitor system can transmit data by the wireless connection, so the hand-held electronic device and the monitor form a system in which they can communicate and connect with mutually. In detail, the display information can be transmitted to the monitor through the hand-held electronic device, and displayed by the monitor. Therefore, the monitor can be utilized as the extended screen or the additional screen of the hand-held electronic device, the transparent touch-sensing layer of the rare earth metal is unnecessary, and the manufacturing cost can be reduced. Moreover, no metal interference fringe will be caused to affect the readability of the display panel, and the performance and convenience of the manual operation will not be lowered down.

As to the shadeless touch hand-held electronic device, the user can perform the touch operation on the touch-sensing cover of the shadeless touch hand-held electronic device, so the user's finger will not shade the view or the software object displayed on the panel, and the touch for opening the link of the high information density image will not erroneously execute. Since operating the electronic device is performed on the touch-sensing cover, the panel scratch can be reduced. Furthermore, because the user can perform the touch operation on the touch-sensing cover, the user can use multiple fingers such as the forefinger and middle finger to operate the electronic device while using the same hand holding the device. In comparison with the conventional art where the user just can use the thumb to execute the operation while using the same hand holding the device, the disclosure can provide more manual efficiency and convenience and can realize a better user experience.

Moreover, when the user executes mouse application program for the shadeless touch hand-held electronic device to successfully perform online connection with the electronic apparatus, the electronic apparatus can be operated by the input action on the touch-sensing cover. Therefore, the shadeless touch hand-held electronic device can be used to operate another electronic apparatus, thus broaden its application.

In addition, in some embodiments, the trigger quantity, the trigger quantity distribution, the trigger morphology, the trigger time, the trigger frequency or the trigger location must firstly conform to the initiative determination condition, and then the hand-held electronic device is permitted to receive the input action from the user and accordingly control the electronic apparatus. Therefore, when other user operates the hand-held electronic device, because the trigger quantity, the trigger quantity distribution, the trigger morphology, the trigger time, the trigger frequency or the trigger location is distinct from the initiative determination condition which is predefined by the origin user, the hand-held electronic device is forbidden to operate so as to enhance the security of the hand-held electronic device.

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A smart monitor system, comprising:
   a hand-held electronic device, comprising:
   a panel;
   an eyeball tracking module, acquiring an eyeball information, wherein the eyeball information corresponds to a position information on the panel, and the position information corresponds to an object displayed on the panel;
   a control unit;
   a touch-sensing cover, having a cover and a touch-sensing structure, wherein the cover is disposed on the side of the hand-held electronic device opposite the panel, partial or total area of the touch-sensing structure is disposed on the cover, and the touch-sensing structure is electrically connected to the control unit;

a wireless communication unit, having a wireless communication chip and an antenna, wherein the wireless communication chip is electrically connected to the control unit, and the antenna is disposed on the touch-sensing cover; and a monitor, having a display panel and a wireless unit, wherein the monitor is wirelessly connected to the wireless communication unit of the hand-held electronic device by the wireless unit;

wherein the wireless communication unit transmits a display information to the monitor by the wireless connection.

2. The smart monitor system of claim 1, further comprising:
a wireless access point, wirelessly connected to the wireless communication unit of the hand-held electronic device and the monitor, wherein the display information is transmitted to the monitor by the wireless access point.

3. The smart monitor system of claim 1, wherein when a user executes a mouse application program, the hand-held electronic device performs online connection with the monitor, so as to operate the monitor by the input action on the touch-sensing cover.

4. The smart monitor system of claim 3, wherein the mouse application program is stored in the hand-held electronic device or the monitor.

5. The smart monitor system of claim 1, wherein the touch-sensing structure comprises metal mesh, metal nanowires, transparent conducting film, carbon nanotube or graphene.

6. The smart monitor system of claim 1, wherein the hand-held electronic device further comprises a charging module, and the monitor transmits a wireless charging energy to the charging module.

7. A hand-held electronic device, wirelessly connected to a monitor, the hand-held electronic device comprising:
a panel;
an eyeball tracking module, acquiring an eyeball information, wherein the eyeball information corresponds to a position information on the panel, and the position information corresponds to an object displayed on the panel;
a control unit;
a touch-sensing cover, having a cover and a touch-sensing structure, wherein the cover is disposed on the side of the hand-held electronic device opposite the panel, partial or total area of the touch-sensing structure is disposed on the cover, the touch-sensing structure is electrically connected to the control unit; and
a wireless communication unit, having a wireless communication chip and an antenna, wherein the wireless communication chip is electrically connected to the control unit, and the antenna is disposed on the touch-sensing cover;
wherein the wireless communication unit transmits a display information to the monitor by the wireless connection.

8. The hand-held electronic device of claim 7, wherein the wireless communication unit comprises infrared module, bluetooth module, zigbee module, radiofrequency module, or near field communication module.

9. The hand-held electronic device of claim 7, wherein the antenna is disposed on the cover or integrated with the touch-sensing structure.

10. The hand-held electronic device of claim 7, wherein the touch-sensing structure comprises a plurality of detection points, the control unit computes a trigger quantity, a trigger quantity distribution, a trigger morphology, a trigger time, a trigger frequency or a trigger location of the detection points with an interval in a predefined time period and compares the trigger quantity, the trigger quantity distribution, the trigger morphology, the trigger time, the trigger frequency or the trigger location with an initiative determination condition pre-stored in the hand-held electronic device, and permits the touch-sensing structure to receive at least one input action inputted by a user if the trigger quantity, the trigger quantity distribution, the trigger morphology, the trigger time, the trigger frequency or the trigger location conforms to the initiative determination condition.

11. The hand-held electronic device of claim 7, wherein the touch-sensing structure comprises metal mesh, metal nanowires, transparent conducting film, carbon nanotube or graphene.

12. The hand-held electronic device of claim 7, wherein the hand-held electronic device further comprises a charging module, and the monitor transmits a wireless charging energy to the charging module.

13. The hand-held electronic device of claim 7, wherein the hand-held electronic device is operated by one hand.

14. The hand-held electronic device of claim 7, wherein the area of the touch-sensing structure and the area of the panel have a ratio relationship, and the control unit converts an input position into a display position on the panel according to the ratio relationship.

15. The hand-held electronic device of claim 7, further comprising a near field communication unit, wherein the near field communication unit has a near field communication chip and an antenna, the near field communication chip is electrically connected to the control unit, and the antenna is disposed on the cover or the touch-sensing structure.

16. The hand-held electronic device of claim 7, wherein the panel display an icon, the icon corresponds to a mouse application program, the mouse application program is executed by the control unit when a user clicks the touch-sensing cover corresponding to the icon displayed on the panel.

17. The hand-held electronic device of claim 7, further comprising:
a capacitance detection unit, coupled to the touch-sensing structure to detect the variation of the coupled capacitor between a first sensing line and a second sensing line, and providing a first finger to input a signal,
wherein the hand-held electronic device confirms a clicked object according to the input signal from the first finger.

18. The hand-held electronic device of claim 7, wherein the touch-sensing structure is capable of a wireless power transmission.

* * * * *